US008599724B2

(12) United States Patent
Packer et al.

(10) Patent No.: US 8,599,724 B2
(45) Date of Patent: Dec. 3, 2013

(54) PAGING SYSTEM

(75) Inventors: Neil Thomas Packer, The Gap (AU); Christopher John Dodds, Beecroft (AU); Donald Backstrom, Kedron (AU); Bruce Maxwell Goldburg, Keperra (AU); Lynton Earl Gough, Everton Park (AU); Robyn Gough, legal representative, Everton Park (AU); Glenn David Thompson, Oxley (AU)

(73) Assignee: Creative Audio Pty. Ltd., Stafford, Qld (AU)

( * ) Notice: Subject to any disclaimer, the term of this patent is extended or adjusted under 35 U.S.C. 154(b) by 1113 days.

(21) Appl. No.: 11/721,442

(22) PCT Filed: Dec. 22, 2005

(86) PCT No.: PCT/AU2005/001961

§ 371 (c)(1), (2), (4) Date: Jul. 20, 2009

(87) PCT Pub. No.: WO2006/066351

PCT Pub. Date: Jun. 29, 2006

(65) Prior Publication Data

US 2010/0008512 A1 Jan. 14, 2010

Related U.S. Application Data

(60) Provisional application No. 60/639,825, filed on Dec. 26, 2004.

(51) Int. Cl.

*H04L 12/16* (2006.01)
*H04Q 11/00* (2006.01)
*H04J 3/26* (2006.01)

(52) U.S. Cl.

USPC .......... 370/270; 370/432

(58) Field of Classification Search

None

See application file for complete search history.

(56) References Cited

U.S. PATENT DOCUMENTS

| | | | |
|---|---|---|---|
| 4,926,460 | A | 5/1990 | Gutman et al. |
| 5,357,511 | A | 10/1994 | DiNapoli |

(Continued)

FOREIGN PATENT DOCUMENTS

| | | |
|---|---|---|
| CA | 2212610 | 2/1998 |
| EP | 1067682 | 1/2001 |

(Continued)

OTHER PUBLICATIONS

A. Zhang, Ethernet Public Address System, Oct. 2002, pp. 1-62.*

(Continued)

*Primary Examiner* — John Blanton
*Assistant Examiner* — Christopher Crutchfield
(74) *Attorney, Agent, or Firm* — DeLio & Peterson, LLC; Peter W. Peterson

(57) ABSTRACT

The present invention relates to a distributed paging system. The distributed paging system includes a combined data and digital audio network and a plurality of paging system consoles. Each paging system console includes an operator interface to select one or more paging destinations and is arranged to transmit data packets including paging destination data across the network. A number of addressable amplifier modules are provided in communication with the network and are responsive to the data packets. Each of the amplifier modules has an associated address and is arranged to operate according to whether paging destination data contained within the data packets relates to the associated address.

34 Claims, 21 Drawing Sheets

(56) References Cited

U.S. PATENT DOCUMENTS

| | | | | |
|---|---|---|---|---|
| 5,406,634 | A | 4/1995 | Anderson et al. | |
| 5,631,968 | A * | 5/1997 | Frey et al. | 381/106 |
| 6,091,826 | A * | 7/2000 | Laitinen et al. | 381/82 |
| 6,329,908 | B1 | 12/2001 | Frecska | |
| 6,700,592 | B1 | 3/2004 | Kou | |
| 6,868,162 | B1 | 3/2005 | Jubien | |
| 2002/0061774 | A1 | 5/2002 | Leyendecker | |
| 2002/0071572 | A1 | 6/2002 | Moertel | |
| 2003/0124954 | A1 | 7/2003 | Liu | |
| 2004/0131199 | A1 | 7/2004 | Moeller | |
| 2004/0165732 | A1 * | 8/2004 | Arcaria et al. | 381/81 |
| 2004/0174988 | A1 * | 9/2004 | Erving et al. | 379/388.07 |
| 2005/0108338 | A1 | 5/2005 | Simske | |
| 2005/0135349 | A1 * | 6/2005 | Poustchi et al. | 370/384 |
| 2005/0201541 | A1 | 9/2005 | Berezowski | |
| 2005/0227650 | A1 * | 10/2005 | Williams | 455/179.1 |
| 2006/0032357 | A1 * | 2/2006 | Roovers et al. | 84/1 |

FOREIGN PATENT DOCUMENTS

| | | | |
|---|---|---|---|
| EP | 1320025 | | 6/2003 |
| GB | 2211685 | | 7/1989 |
| GB | 2249231 | | 4/1992 |
| GB | 2386498 | * | 9/2003 |
| GB | 2389487 | | 12/2003 |
| JP | 58 111790 | | 7/1983 |
| JP | 59-101916 | | 6/1984 |
| JP | 2 257472 | | 10/1990 |
| JP | 2003 319486 | | 11/2003 |
| JP | 2005-086284 | | 3/2005 |
| WO | WO 95/22129 | | 8/1995 |
| WO | WO96/36109 | | 11/1996 |
| WO | WO00/47014 | | 8/2000 |
| WO | WO02/007174 | | 9/2002 |
| WO | WO 02/076149 | | 9/2002 |
| WO | WO 03/055196 | | 7/2003 |

OTHER PUBLICATIONS

A. Chambers, Ethernet Public Address System, Oct. 2002, pp. 1-62.*

A. Buttery, Ethernet Based Public Address System, Oct. 2003, pp. 1-73.*

A. Buttery, Ethernet Based Public Address System, Thesis, Oct. 2003, pp. 1-65.*

Author Unknown, The Media Matrix Control Matrix User's Manual, Jul. 2003, pp. 1-212.*

Author Unknown, The PM-660U Desktop Mount Packaging Microphone, as retrieved from the internet archive, www.archive.org, on Mar. 25, 2004, pp. 1-2.*

Author Unknown, Gateway Connected Music Player Help Guide, as retrieved from the internet archive, www.archive.org, on Jun. 19, 2004, pp. 1-7.*

Author Unknown, BMS Music and Announcement Player for Business, as retrieved from the internet archive, www.archive.org, on Oct. 11, 2004, pp. 1-4.*

* cited by examiner

PAGING SYSTEM

CROSS-REFERENCES TO RELATED APPLICATIONS

This application claims priority from, and the benefit of, U.S. Provisional Patent Application No. 60/639,825, filed Dec. 26, 2004 and titled "AN IMPROVED PAGING SYSTEM". The disclosures of said application and its entire file wrapper (including all prior art references cited therein) are hereby specifically incorporated herein by reference in their entirety as if set forth fully herein.

FIELD OF THE INVENTION

The present invention relates to public address systems and more specifically to paging systems.

BACKGROUND TO THE INVENTION

The reference to any prior art in this specification is not, and should not, be taken as an acknowledgement or any form of suggestion that the prior art forms part of the common general knowledge.

Paging systems in large venues are highly complex and typically involve many paging sources and speakers geographically distributed over a large number of message delivery zones. Consequently the operation of configuring a large paging system is complex and in the past has often been time consuming. It would be desirable if an improved approach to configuring a paging system were provided.

Paging systems typically include a number of paging console units distributed throughout a public venue. The paging console units are equipped with microphones and are usually coupled to some type of central switching box. The switching box directs messages from a particular paging unit to one or more selected destinations that are typically loudspeaker installations.

A problem that occurs with a paging network of the type described above is that failure of the switching box will generally cause catastrophic failure of the paging system. Where paging systems are installed in large public venues such as airports or stadiums the paging system may extend across several geographical zones. The proper operation of the paging system, so that messages can be delivered to each zone, is of critical importance in the event of an emergency situation arising. It would be advantageous if an improved paging system were provided that did not rely on a central switching box.

A related problem that arises in large paging systems is that it may be difficult for a paging console operator, or other administrator of the system, to determine whether or not system equipment in remote zones is functioning correctly. A paging system that is able to provide that information would be advantageous.

The inventors have observed that the ambient acoustic environment typically varies dynamically from zone to zone of a paging system. Consequently, while paging parameters may be configured to optimise intelligibility of delivered pages close to a paging source, those parameter settings may be less than optimal in zones at which the message is delivered. It would be desirable if a paging system were provided that addressed this problem.

It is an object of the present invention to provide a paging system that addresses one or more of the above described problems and provides a useful alternative to paging systems that have been hitherto known in the prior art.

SUMMARY OF THE INVENTION

The present inventors have sought to address the above-described problems by providing:

in a first aspect, a distributed paging system including;

a combined data and digital audio network;

a plurality of paging system consoles, each including an operator interface to select one or more paging destinations and arranged to transmit data packets including paging destination data across said network; and a number of addressable amplifier modules in communication with said network and responsive to the data packets;

wherein each of said amplifier modules has an associated address and is arranged to operate according to whether paging destination data contained within the data packets relates to said associated address.

Each paging system console may further include a microphone for receiving audio, and an A/D converter for converting the received audio to digital data for inclusion with the data packets. Each paging system console may further include a push to talk (PTT) actuator for enabling transmission of the data packets. Each paging system console may further include a microphone monitor for monitoring whether the microphone is functioning correctly. In one embodiment, the microphone functions correctly when an audio signal level input to the microphone exceeds a predetermined threshold. The paging console may further include a means for controlling the gain of the microphone based upon the input audio signal.

Each paging system console may include a keypad for entering user data and a display for displaying the user data. Each paging system console may be of a generally tapered shape so as to define a face including the keypad and the display. Each paging system console may include address setting means for setting a unique network address of the console. The address setting means may include a pair of rotating knobs.

The network may be an Ethernet or other like Local Area Network (LAN).

Each amplifier module may include a display for displaying its operating status.

Each amplifier module may include a microphone input to receive ambient audio.

Each amplifier module may include one or more power amplifiers each for interfacing with a respective speaker. Each speaker may, in use, output audio sent over a respective audio channel.

The distributed paging system may further include one or more message machines for retrieving (and storing) the data packets from (and to) respective storage mediums. Each message machine may have a unique identifier by which it can be identified during communications. Each message machine may include a scheduler for sending messages over the network at scheduled times. Each message machine may be loaded with a software application to convert text segments into spoken messages.

The distributed paging system may further include an interface for interfacing the network and a plurality of analogue inputs together, the interface being configured to translate audio into data packets.

The distributed paging system may further include a background music input unit for transmitting background music data over the network.

The distributed paging system may further include a control panel for enabling a user to control the paging data. The user may thereby control a paging zone associated with the paging data. The control panel may include any one or more of the following group: a display for displaying background music selections, a rotary encoder for setting audio levels of the paging data, and buttons for adjusting source selection and page inhibit functions of the network.

The distributed paging system may further include one or more local volume controllers for each controlling the volume of a respective speaker interfaced to an addressable amplifier module. The local volume controller may include a knob for enabling a user to vary the volume and a display for displaying the volume of the speaker.

The distributed paging system may further include device for receiving inputs and selecting and sending data packets responsive to the received inputs. The inputs may be derived from switches, potentiometers, voltage sources or other like input means.

According to a final aspect of the invention there is provided a distributed paging system including;

a plurality of paging console units, each including an operator interface to select one or more destination paging zones, a microphone and a network interface circuit for transmitting digital audio signals and command signals across a network; and a number of addressable amplifiers each including a network interface circuit in communication with the network and arranged to transmit data indicating operational status and local ambient acoustic conditions across the network.

According to another aspect of the present invention there is provided a paging system console including:

a digital audio source to generate paging messages;

a processor arranged to generate command signals indicating one or more network destination zones for the paging messages;

a network interface circuit arranged to deliver the paging messages and command signals to the network;

wherein the processor is further arranged to determine availability of destination zones and to store the paging messages locally in the event of a message's destination zone being unavailable.

The paging system console may include a microphone for receiving audio for including with the generated paging messages. The paging system console may further include a push to talk (PTT) actuator for enabling transmission of the generated paging messages.

The paging system console may further include a keypad for entering user data and a display for displaying the user data. Each paging system console may be of a generally tapered shape so as to define a face including the keypad and the display.

The paging console may include address setting means for setting a unique network address of the console to be included with the paging messages.

The network may be an Ethernet or other like Local Area Network (LAN).

According to a further aspect of the present invention there is provided a computer software product containing instructions for execution by an electronic processor including:

instructions to communicate with a number of network audio processing devices;

instructions to generate a graphical user interface to display operational status of said devices; and instructions to adjust the operation of said devices in response to received operator adjustments.

The instructions to communicate may include instructions to configure paging system consoles interfaced to the network. The instructions to configure may include instructions to set input controls of the paging system consoles.

The instructions to generate may include instructions to graphically display a schematic layout of each device interconnected to the network.

The instructions to adjust the operation may include instructions to enable a user to adjust the interconnections between devices. The instructions to adjust the operation may include instructions to adjust any one or more of the following group: a zone associated with an audio processing device, an identifier of the audio processing device, the type of the audio processing device, network interconnections associated with the audio processing device.

The computer software product may further include instructions for storing a configuration record including configuration data responding to one or more audio processing devices.

The computer software product may further include instructions for monitoring the status of the audio processing devices. The instructions for monitoring may include instructions to poll each audio processing device. The instructions for monitoring may include instructions for displaying a log of activity of each audio processing device. The instructions for monitoring may include instructions for requesting the current operating state of each audio processing device.

The computer software product may further include instructions for monitoring traffic on the network.

According to another aspect of the present invention there is provided an amplification and monitoring control apparatus including:

an addressable network interface circuit for communication with a network;

a D/A converter for producing analogue signals corresponding to digital audio received via the network interface circuit; and a local microphone port for connection to microphone to pick-up ambient sounds; and a processor coupled to the addressable network interface circuit and responsive to the local microphone port to derive parameters on the basis of the ambient sounds and to transmit the parameters across the network.

Preferably, the amplification and monitoring apparatus is configured to generate tones and noises in response to commands received via the network interface circuit.

The apparatus may include a display for displaying the apparatus operating status.

The apparatus may include a microphone for interfacing to the microphone port.

The apparatus may include one or more power amplifiers each for interfacing with a respective speaker. Each speaker may, in use, output audio sent over a respective audio channel.

The apparatus may include an amplifier having variable gain based on the level of ambient sounds picked up by the microphone.

The apparatus may include a tone generator for generating tones during testing. The apparatus may include a tone generator for generating white or pink noise.

According to a further aspect of the present invention there is provided a method for a network device of a paging network to start a paging event in the paging network, the method including the steps of:

receiving a start of paging message; and determining for each zone of each channel of the network device if the message includes a command for the network device to start paging said zone.

The step of determining may include comparing a priority level at which the zone is busy to a priority level indicated in the start of paging message. The method will preferably also include checking if the zone is page inhibited.

In a preferred embodiment the method includes adding paging audio into a mix provided by the network device where the current zone is indicated in the start of paging message and the current zone is available at a priority also indicated in said message.

Preferably the method includes storing paging information for later use where the current zone is indicated in the start of paging message and the current zone is unavailable at a priority also indicated in said message.

The method may include the step of ramping down background audio in said mix whilst adding the paging audio.

In the preferred embodiment the network device comprises an amplifier control module including circuitry arranged to monitor network data including start of paging messages.

According to a further aspect of the present invention there is provided a method for a network device of a paging network to end a paging event in the paging network, the method including the steps of:

receiving an end of paging message; and determining for each zone of each channel of the network device if the message includes a command for the network device to cease paging said zone.

The step of determining will preferably include comparing a priority level at which the zone is busy to a priority level indicated in the end of paging message.

The method will typically involve removing paging for a current page at the current priority if the zone is busy at a higher priority to that indicated in the end of paging message.

The method may include switching paging audio of the network device to a higher priority paging channel if the zone is busy at a lower priority to that indicated in the end of paging message.

In one embodiment the method will include removing paging audio from a mix provided by the network device where the current zone is indicated in the end of paging message and the current zone is busy at a priority also indicated in said message.

Preferably the method includes the step of ramping up background audio in said mix whilst removing the paging audio.

The network device will typically comprise an amplifier control module including circuitry arranged to monitor network data including end of paging messages.

According to a further aspect of the present invention there is provided a network device to vary gain of an amplified signal based on ambient levels in an acoustic space measured by a microphone, the method including the steps of:

setting ambient signal to the difference of a program source signal and an ambient sense signal measured by the microphone;

determining if the program signal requires gain change based on the ambient signal; and if the program signal is determined to require gain change then either increasing the program signal gain in the event that the ambient signal is louder than expected, or in the alternative, decreasing program signal gain.

The steps of setting, determining and either increasing, or in the alternative, decreasing are typically repeated continuously in order that the program signal gain be varied dynamically.

According to another aspect of the present invention there is provided a processor in communication with the network interface circuit;

a connection point for a speaker coupled to the processor; and a memory device loaded with instructions for execution by the processor;

wherein the memory device is loaded with instructions including:

instructions for the processor to check that predetermined signals are present at the connection point within predetermined time frames; and instructions for the processor to issue alert messages through the network interface circuit to paging network devices in the event said predetermined signals are not present within said time frames.

The speaker load monitoring apparatus may further include:

instructions for the processor to compare a predetermined tone with a prestored ideal tone; and instructions for the processor to issue messages through the network interface circuit to indicate that the predetermined tone compares anomalously with the pre-stored ideal tone.

In one embodiment the speaker load monitoring apparatus includes instructions for the processor to log said alert messages for later retrieval via the network interface circuit.

According to another aspect of the present invention there is provided a message issuing apparatus for connection to a distributed paging system, including:

a network interface circuit;

a processor in communication with the network interface circuit;

a non-volatile memory to store paging messages for playback; and a memory device loaded with instructions for execution by the processor. including instructions to monitor a network connection for requests to deliver messages from the non-volatile memory to a network of the distributed paging system.

The instructions will preferably include:

instructions for the processor to monitor network traffic indicating the engaged, status of zones of the distributed paging system.

In one embodiment the apparatus is further programmed with instructions to delay delivery of messages from the non-volatile memory to zones of the distributed paging system indicated to be engaged.

Preferably the instructions include instructions for the processor to implement a message scheduler.

Instructions to maintain a configuration record of network devices connected to the distributed paging system may also be incorporated. Said configuration record preferably including a network identity for each of said network devices.

The messaging apparatus may also be loaded with instructions to convert messages received over the network in text format into a spoken message format.

Preferably the messaging apparatus includes instructions for a software application to allow message segments to be joined into a single paging message thereby facilitating the making of automated messages customised to a specific purpose.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF EXEMPLARY EMBODIMENTS

Overview

Figure 1:
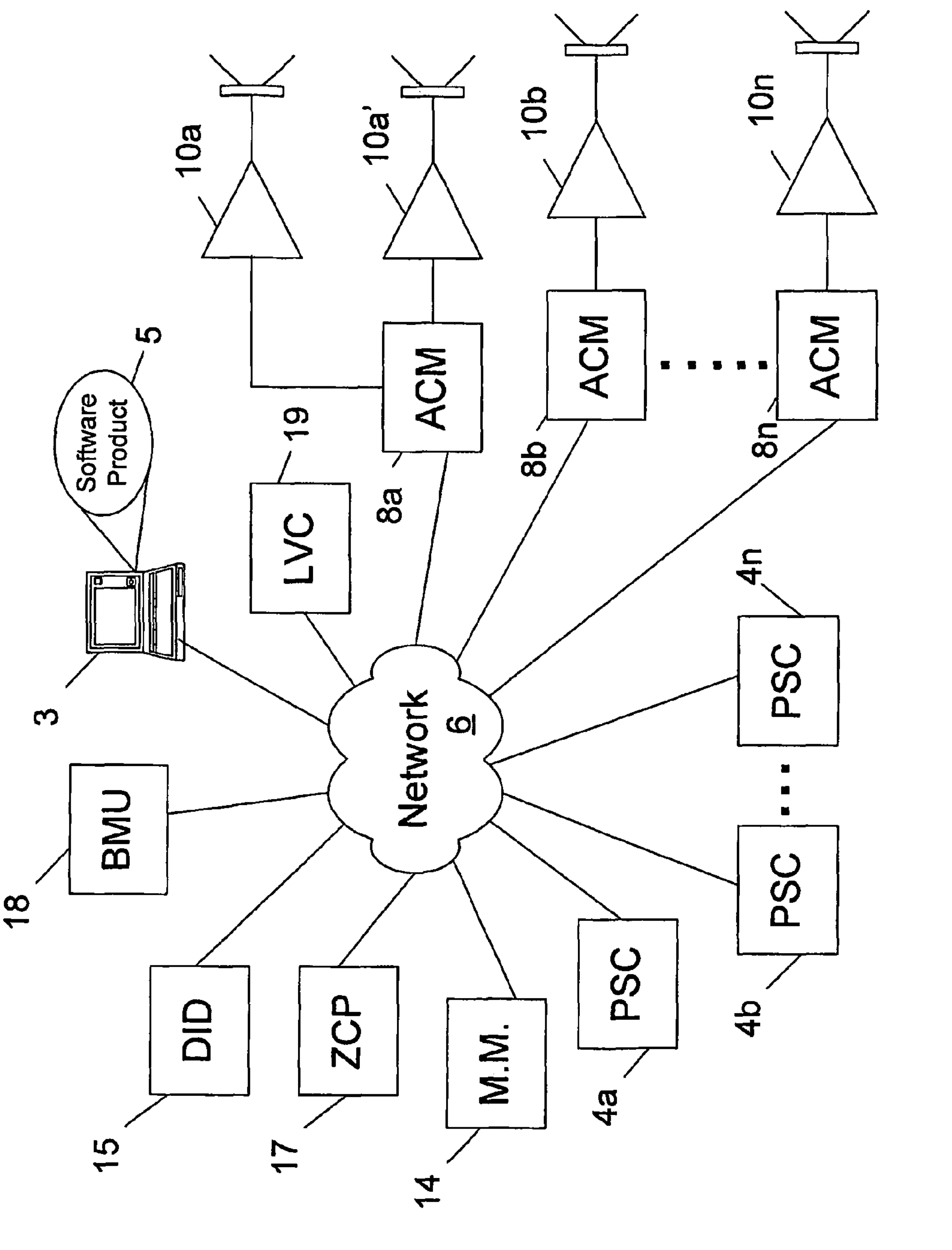
FIG. 1 is a block diagram of a paging system according to an embodiment of the present invention.

In order to give an overview of a paging system according to a preferred embodiment of the present invention, reference will initially be made to FIG. 1. The Paging network includes a number of Paging System Consoles (PSCs) 4*a*-4*n* which each include a microphone to receive spoken messages. The Paging System Consoles are each connected to a local area data network 6. The data network is configured to support a proprietary audio communication protocol called CobraNet which runs on top of a standard Ethernet protocol. Information about CobraNet is publicly available at the following Internet addresses:

http://www.peakaudio.com/CobraNet/Background.html, with more technical information at:

http://www.peakaudio.com/CobraNet/Developer/tech_data_sheet.htm.

Devices to implement CobraNet are produced by Cirrus logic and are described at:

http://www.cirrus.com/en/products/pro/areas/netaudio.html. Other manufacturers that use CobraNet technology are listed at http://www.peakaudio.com/CobraNet/licensee/index.htm.

Configuration of the paging system is accomplished by means of a PC 3 that runs a software product 5 for the graphical setting and interconnection of the various modules of the paging system. Software product 5 comprises machine readable instructions borne upon magnetic or optical media as is standard in the art. PC 3 need only be connected to the network during configuration.

Also attached to network 6 are a number of Amplifier Control Modules 8*a*-8*n* (ACMs). The Amplifier Control Modules each drive one or more respective power amplifiers 10*a*, 10*a*', 10*b*, . . . , 10*n*. It will be noted that, in the present example, ACM 8*a* controls two power amplifiers, being amplifier 10*a* and amplifier 10*a*' which are assigned to independent channels provided by the ACM. Each ACM may provide a number of channels as required.

Other units that are also connected to network 6 include Message Machine 14, Zone Control Panel 17, Local Volume Control unit 19, Digital Interface Device 15 and Background Music Unit 18. Each of the various units that are connected to network 6 has a unique network address. Messages sent from any one of the paging control units 4*a*-4*n* are addressed to any one, or more, of the Amplifier Control Modules 8*a*-8*n*. It will be observed that the paging system described does not include a central switching box and so is not susceptible to the problem discussed previously in relation to prior art paging systems.

GLOSSARY

For convenience the meanings of a number of terms that are commonly used throughout the following description will now be given:

zone: an indivisible entity that forms a destination for a live page or playback of recorded announcement. A group of contiguously located paging speakers, typically operating in a single acoustic space which it makes sense to operate as a group.

engaged zone: a destination zone for a currently active paging event. eg. currently receiving audio from a paging station.

destination zone (destination paging zones): a zone that is one of the intended destinations for a paging event.

zone list (packet's zone list): a list of numbers (value 1 to 255) each representing a zone.

acoustic space: an area to which sounds are constrained.

page code: a code used to represent the definition of a paging event. Page code attributes include live or recorded message, attributes of recorded messages, message priority, live or delayed message, preamble messages and associated sign text attributes.

paging event (page event): a live page or playback of recorded announcement to a zone or list of zones.

currently active paging (active page): a paging event that is currently audible in a zone or zones.

field devices: any of the devices in a paging system including the following: PSC, ACM, ZCP, LVC, MM, DID and BMU. Does not include generic networking infrastructure.

priority (higher, lower): a relative importance level associated with various paging events. Higher priority paging events will have precedence over lower priority ones.

timestamp (time-stamped): a recorded instant in time. An event that has its time of occurrence recorded is time-stamped.

Paging System Console (PSC)

Figure 2:
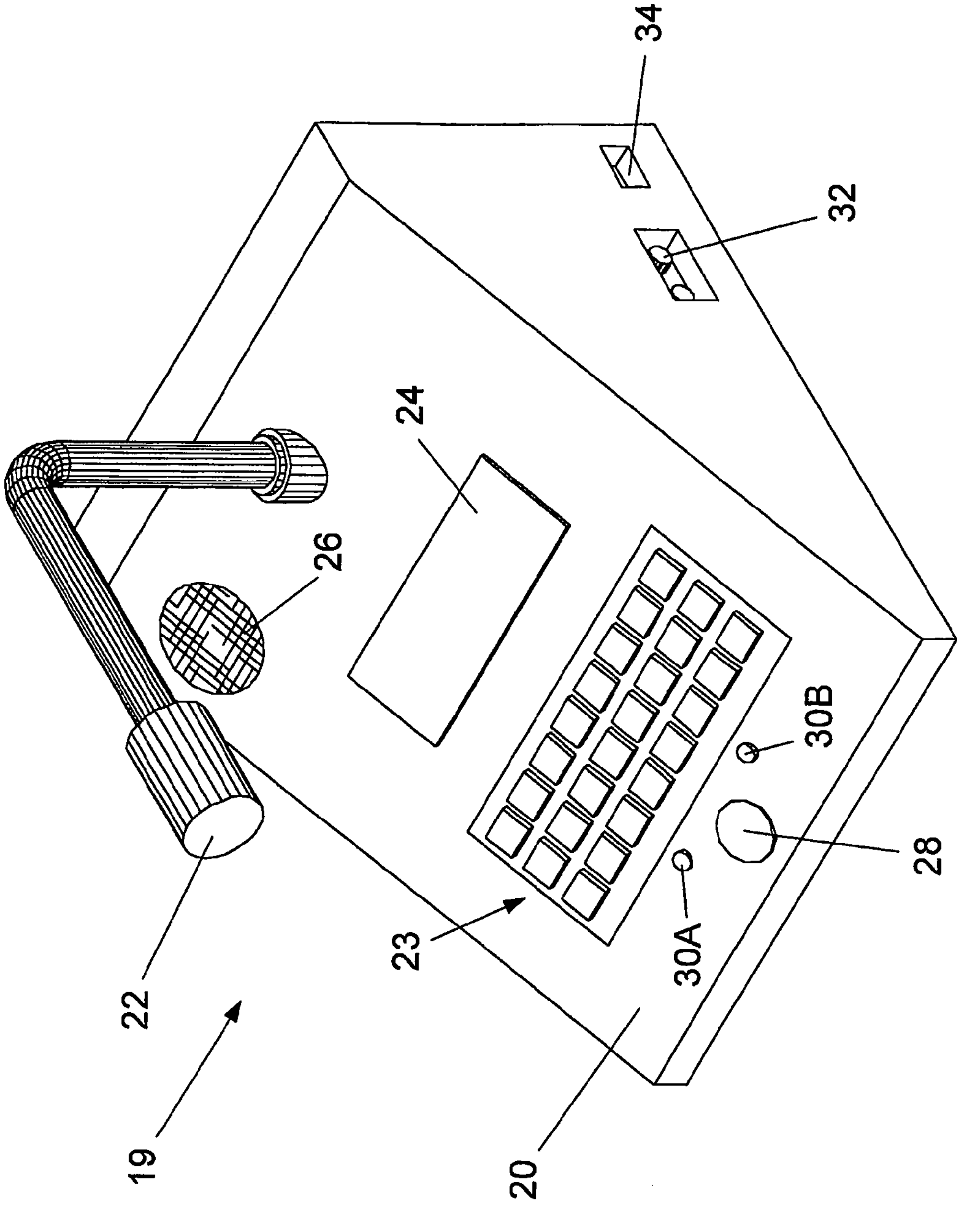
FIG. 2 is a perspective view of a Paging System Console unit according to an embodiment of the present invention.

FIG. 2 is a perspective view of a paging system console (PSC) 19 according to an embodiment of the present invention. The PSC includes a wedge-shaped casing 20 that houses various signal and data processing circuits as will be explained shortly. A goose-neck microphone 22 extends from the casing. Mounted to the front of the casing are a number of controls and indicators including a keypad 23, an LCD display 24, an audition speaker 26 and a push-to-talk button 28, adjacent to which dual LEDs 30A, 30B are mounted. Recessed on the housing 20 are two rotary switches 32 that are used to set the PSC's unique ID on the network. An RJ45 socket 34 is mounted into the casing for Ethernet cable connection to network 6.

Functional equivalents of the console of FIG. 2, suitable for mounting in particular desired situations may be readily provided. For example, a wall mounting version of the console may be provided. In addition, versions of the console may also be provided with all controls and displays incorporated within a touch-screen graphic display.

Figure 3:
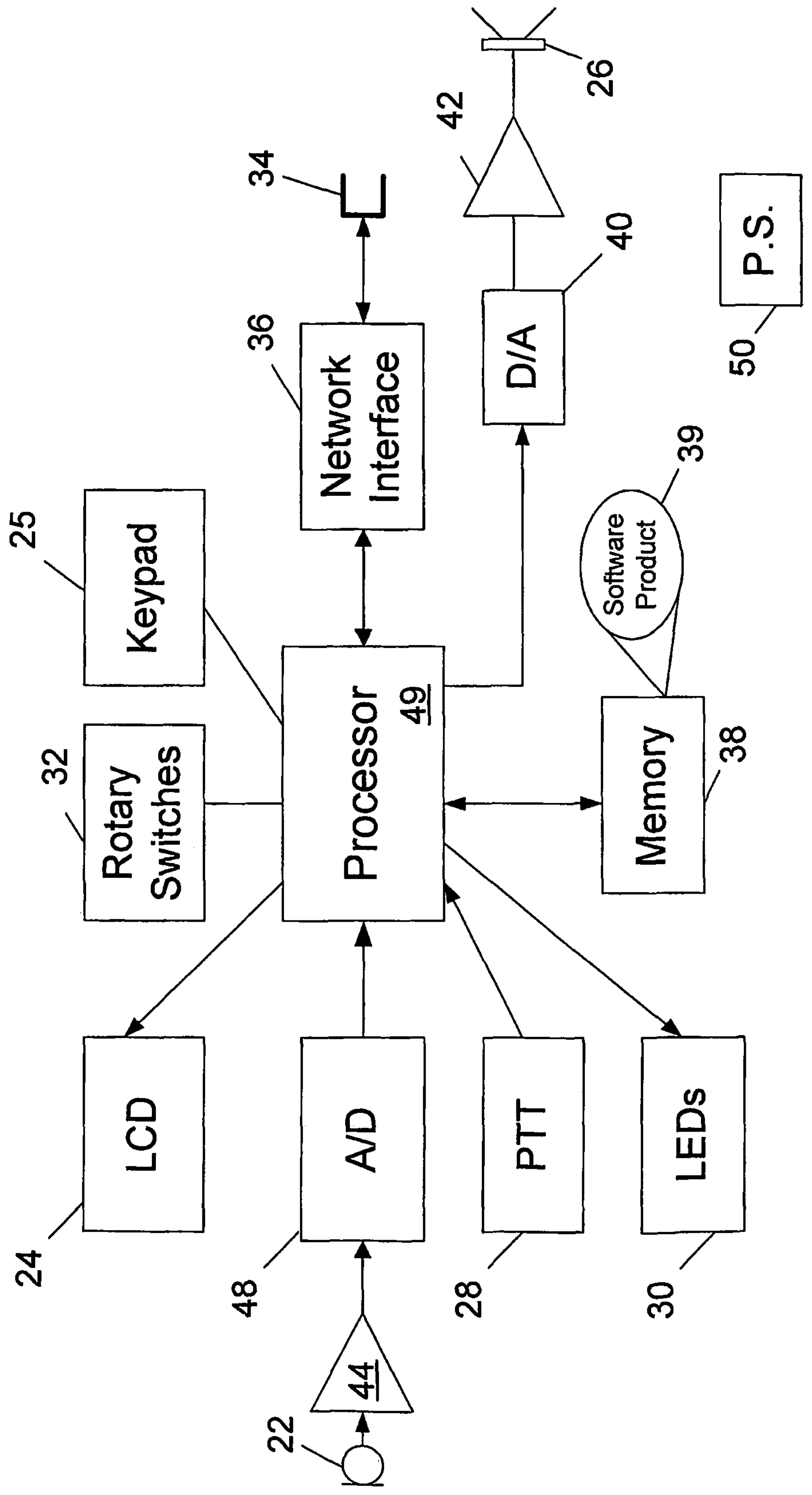
FIG. 3 is a block diagram of the Paging System Console unit of FIG. 2.

FIG. 3 is a functional block diagram of PSC 19. The PSC is built around a microprocessor 49 that is adapted for Digital Signal Processing (DSP) applications for example the Cirrus Logic CS18110. Information about the CS18110 is publicly available from the *CS*1810*xx, CS*4961*xx and CobraNet CM*-2 *Module Hardware User's Manual*, published June 2005 by Cirrus Logic, Inc. of 2901, Via Fortuna Austin, Tex. 78746 United States and which is hereby incorporated in its entirety by reference.

Microprocessor 49 executes a software/firmware product 39 that comprises instructions stored in memory 38. The PSC further includes a microphone 22 coupled to a preamplifier 44. The microphone preamplifier gain is preset to accommodate typical ranges of acoustic input levels. The output from preamplifier 44 is converted to a digital signal by A/D 48 for processing by microprocessor 49.

Memory 38 comprises a number of memory devices. Flash memory storage is provided to store program code and audio files, or "bells", that are played to herald an imminent announcement. SRAM is provided to store operating memory for microprocessor 49. SDRAM is provided for message store-and-forward.

Microprocessor 49 monitors signals from push-to-talk button 28, rotary switches 32, keypad 25 and network interface module 36. It will be realised that suitable interfacing circuitry, not shown, is provided to interface between microprocessor 49 and each of the various modules with which it communicates. Microprocessor 49 controls LCD display 24, LED 30 and network interface 36. It also transmits digital audio signals to digital-to-analog converter 40. The output of converter 40 is passed to amplifier 42 for annunciating by audition speaker 26. The PSC is powered by a suitable power supply 50, for example one conforming to international standard IEEE801.3af.

The PSC retains its entire configuration internally in non-volatile memory. As will be explained further shortly, the configuration is uploaded via the Ethernet interface from PC 3 (FIG. 1). Alternately, in the absence of PC 3, the PSC will request configuration from a configuration store implemented in Message Machine 14.

The configuration data includes the following information as set out in Table 1:

TABLE 1

1. PSC Label: A descriptive label used to identify a PSC and its location (40 characters).
2. PSC ID: A single byte number used to uniquely identify a particular PSC. This provides an addressing mechanism for the PSC.
3. MAC Address: The 6 byte MAC address of the PSC's network interface.
4. IP Address: The 4 byte IP address to be assigned to the PSC used for FTP/TFTP transfer of configuration and for monitoring via SNMP.
5. Preferred CobraNet bundle. The particular PSC can use to transmit paging audio.
6. Page codes: A list of three digit page codes that can be used by the PSC. Page codes are used to define a paging event. The page code specifies a list of destination paging zones, whether a bell should be played prior, and whether the page is to be live, delayed release or the release of a pre-recorded announcement, text attributes and text string.
7. Message Machines: The PSC is able to access Message Machines. These machines may be requested to play pre-recorded messages on behalf of the PSC. The PSC maintains a list of Message Machines that it may use to request playback. The list is based on the Message Machine ID.
8. Digital Signal Processing signal chain operating parameters including such things as equaliser settings, levels, compressor and limiter. 500 bytes.

Rotary switches 32 are used to dial up the ID for a particular PSC. Each PSC is also assigned an IP address. IP addresses are assigned using the methods generally available to all CobraNet devices as listed in the *CobraNet Programmer's Reference Version* 2.1 published October 2004 by Cirrus Logic, Inc. of 2901, Via Fortuna Austin, Tex. 78746 United States, which is hereby incorporated in its entirety by reference.

At the time of writing the above document can be downloaded from: http://www.cirrus.com/en/pubs/manual/CobraNet_Programmer_Manual_PM21.pdf.

Digital audio is transported to and from the PSC by means of network interface 36. The network interface comprises a Cirrus CobraNet interface, (for example model CS18101), and a generic Ethernet network infrastructure. A single, multi-destination audio channel is provided for live or recorded paging audio leaving the PSC. A return audio channel is also provided to facilitate monitoring of paging audio by means of audition speaker 26.

Paging control packets comprise broadcast ethernet packets. An actively paging PSC is programmed to transmit paging control packets to initiate a page and to continue periodically for the duration of a page. The transmission frequency may be adaptive or made system-configurable so that they can be set by means of PC 3.

The paging control packet is of the form set out in Table 2 below.

TABLE 2

| Field | Length (bytes) | Description |
|---|---|---|
| Packet Type | 1 | Page or BGM request |
| Source Type | 1 | Device type of audio source |
| Source ID | 1 | Address of source device |
| Page handle | 1 | Arbitrary identifier for page event generated by the source |
| Page Priority | 1 | |

TABLE 2-continued

| Field | Length (bytes) | Description |
|---|---|---|
| Zone count | 1 | |
| Zone List | n | 1 byte per zone |

The PSC is programmed so that in response to an operator requesting playback of a recorded announcement it transmits a suitable request to Message Machine 14 (FIG. 1). Upon receiving the request the Message Machine transmits a message to the destination Amplifier Control Modules 8*a*, . . . , 8*n* (FIG. 1) advising of the impending page. The packet sent to the Message Machine is a unicast packet.

The recorded announcement request packet is of the form shown in Table 3.

TABLE 3

| Field | Length (bytes) | Description |
|---|---|---|
| Packet Type | 1 | Recorded announcement |
| Source Type | 1 | Device type of audio source |
| Source ID | 1 | Address of source device |
| Page handle | 1 | Arbitrary identifier for page event generated by the source |
| Page Priority | 1 | |
| Preamble bells flag | 1 | |
| Zone count | 1 | |
| Zone List | n | 1 byte per zone |
| List length | 1 | Number of wave files in the list |
| wav file name list | m | Use packet size to determine how big this is. Null terminated. |

The PSC is programmed to listen to page control packets received from other paging devices on the network (this includes packets from Message Machine 14). It is programmed to use the information in these packets to generate an engaged zone list and to resolve simultaneous page requests. It also keeps track of the number of multicast network packets being employed by the system.

The PSCs are programmed so that in the case where two PSCs page the same zone simultaneously the PSC with the lowest priority page backs out and routes audio to the local store and forward memory. If both page at the same priority the PSC with the lowest ID will back out of the page.

A PSC constantly monitors critical aspects of its operation. These aspects include Power supply rails
Memory operation
Program instruction checksums
network error rates/connection faults
Critical audio signal path
Software operation faults Any anomalous behaviour is stored in an internal log, together with a timestamp to allow accurate diagnosis of fault conditions. The LCD display 24 is used to indicate that a fault has occurred. All faults are available for interrogation from the PC 3 in FIG. 1 running a system monitoring application.

The system monitoring application uses the network, and communications protocols running on that network to interrogate all devices on the network for their current operational status. In addition, the system monitoring application can download the internal logs of each device, and collate and display them in a form that is suitable for the operator.

In use, an operator of PSC 19 (FIGS. 2, 3) selects a type of paging event and its intended destination zone by using keypad 25 to select a page code from a number of paging codes displayed on LCD 24. When the microphone PTT switch 28 is off, microprocessor 49 mutes the audio path from the microphone input. PTT switch 28 is pressed to initiate a page. As previously mentioned, memory 38 includes segments dedicated to store and forward messages. Live announcements that are unable to be delivered immediately, due to unavailability of destination paging zones are stored in memory.

If an operator selects a pre-recorded message playback, and then presses the PTT switch 28 momentarily (until its status LEDs 30 indicate that the request has been accepted), then a pre-recorded message is released to the zones associated with the selected page code. In order to do this the PSC is programmed to send a request to Message Machine 14 with a list of selected zones and a list of one or more wave file names. The Message Machine then retrieves the requested messages in turn from its internal memory and transmits it onto network 6.

In order to transmit a spoken announcement the operator selects a page event of "live" type from amongst a menu of possible page events displayed upon LCD 24. The operator then presses and holds PTT switch 28. Status LEDs 30, controlled by microprocessor 49 during the paging event, visually indicate to the operator the point to commence speaking the message into microphone 22.

Additionally, the PSC is programmed to monitor the signal chain from microphone 22 through A/D converter 48 by sensing and analysing characteristics of the ambient noise detected by the microphone. Processor 49 is able to determine when failure in this signal path has occurred due to its execution of an ambient noise analysis program comprising part of software 39. The design of the ambient noise analysis program takes into account the following observations.

The inventors have observed that when human speakers use a microphone, all talkers will produce a level of sound (measured in dBSPL) within a certain volume range at the microphone. When there is no speech, the microphone receives ambient signals from background noise in the environment. In this system, the paging microphone is normally setup for a talker delivering a nominal level of around 90 dBSPL at the microphone. When working at this point, the electronics in the PSC are able to detect the sound and turn it into an electrical signal that is some 70 dB higher in level than the residual noise signal (the "theoretical noise floor") which is always present in electrical circuitry, and cannot be economically eliminated. Thus, sound levels detected by the microphone and converted into an electrical signal can be up to 70 dB quieter than the nominal level generated by a talker, yet will still be distinguishable as speech above the noise floor. As a result, ambient sounds down to around 20 dBSPL can be converted to an electrical signal and still be detected by the microprocessor. An electrical signal measured by the microprocessor (speech or ambient noise) above the "theoretical noise" limit is an indication of a valid microphone path.

Others have observed that the ambient noise level present in a standard office is typically 65 dBSPL, and that of a library (normally assumed a quiet environment) is 35 dBSPL. Both of these environments are above the detection threshold of 20 dBSPL, and so a working microphone can be accurately detected.

In the event that microprocessor 49 measures insufficient noise to indicate that the microphone is working, it operates speaker 26 to produce a low level sound. As a result of the loudspeaker noise, the noise level detected at the microphone is guaranteed by design to be above 40 dBSPL. That noise level is considered undetectable in a normal office environment. If, in the presence of noise from the speaker the signal from the microphone still cannot be detected, a signal path failure is indicated. In that event the microprocessor is programmed to issue a warning signal.

In summary, the ambient noise analysis program includes instructions for the PSC to perform the following steps to determine operational status of the microphone signal path.

1. Measure the level of signal presented to the A/D converter.
2. Compare the level of the signal with the noise always present in the electronics.
3. If signal>predetermined threshold, microphone is OK. End.
4. Activate speaker
5. Measure the level of signal presented to the A/D converter.
6. Compare the level of the signal with that expected by design.
7. If signal level>predetermined threshold, microphone is OK. End.
8. Microphone path has failed. Log error.

The inventors have observed that the quality of audio from paging microphones can vary depending on some variations in usage. These variations, if uncompensated, can lead to degradations in intelligibility of announcements from that microphone. To improve audible performance, the PSC also executes a microphone-compensation program that forms part of software 39. The microphone-compensation program is designed to compensate for variations in microphone response due to variations in usage by a multiplicity of operators. Such variations are due to some users speaking close to the microphone while others speak far away. Close speakers invoke the 'proximity effect' characteristic of directional microphones, whereby there is an unnatural increase in the amount of bass energy in the resulting audio. If uncompensated, this leads to a degradation in speech intelligibility, and the perception by listeners of a lack of quality or control. The microphone compensation program attempts to return the bass energy of a signal to a more natural level. This is achieved through the application of a multi-frequency band compressor that acts upon audio frequencies below 400 Hz. The compressor is programmed to minimise dramatic increases in bass energy above a certain predefined threshold but in such a way as to be imperceptible to a listener. The PSC is further programmed to compensate for normal sound level variations caused by speaker distance and variations in speech level. Compensation is provided by dynamically adjusting system gain depending on measured level to achieve a relatively constant target output level.

Amplifier Control Module (ACM)

Figure 3A:
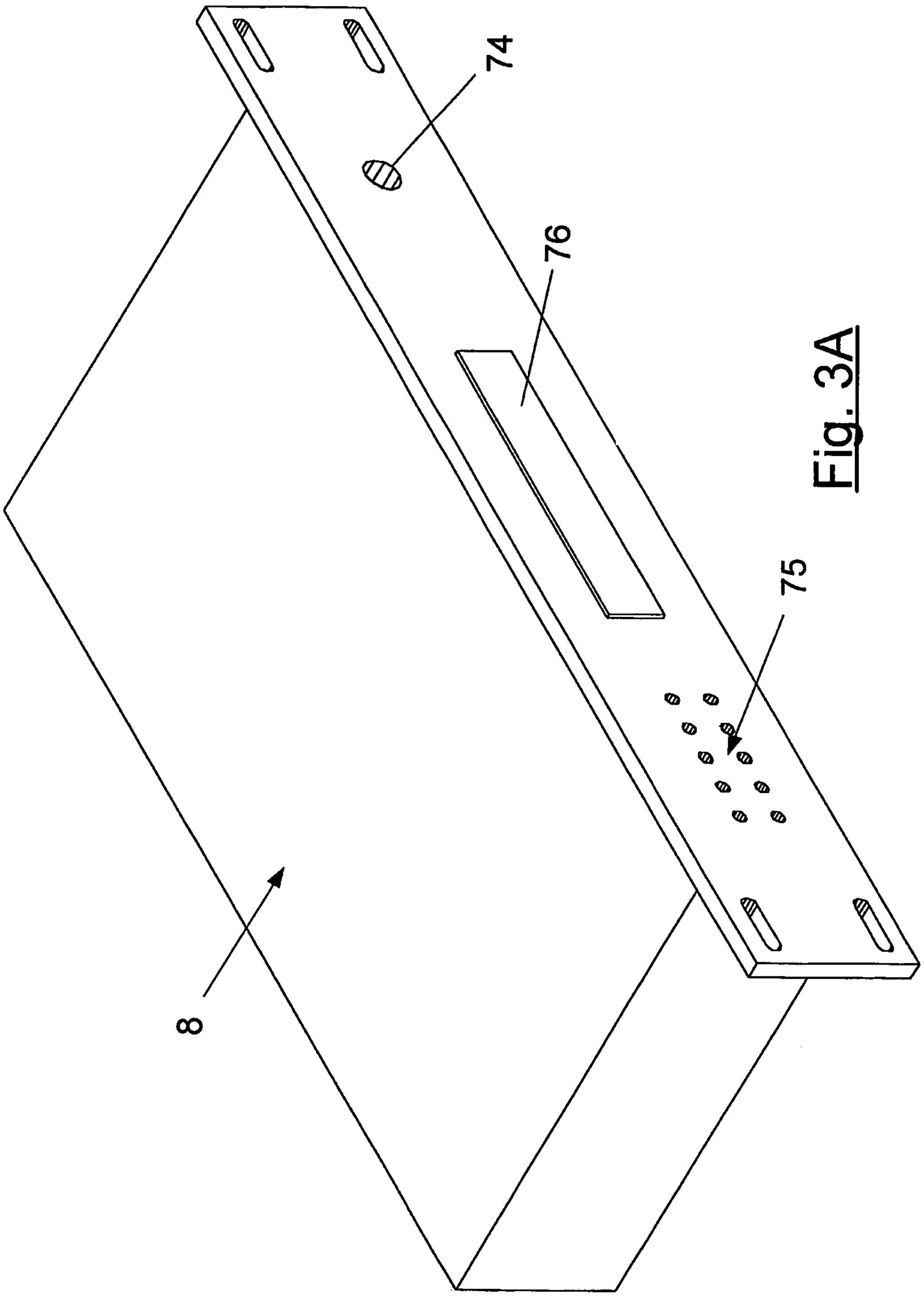
FIG. 3A is a view of the front of an Amplifier Control Module according to an embodiment of the present invention.
Figure 3B:
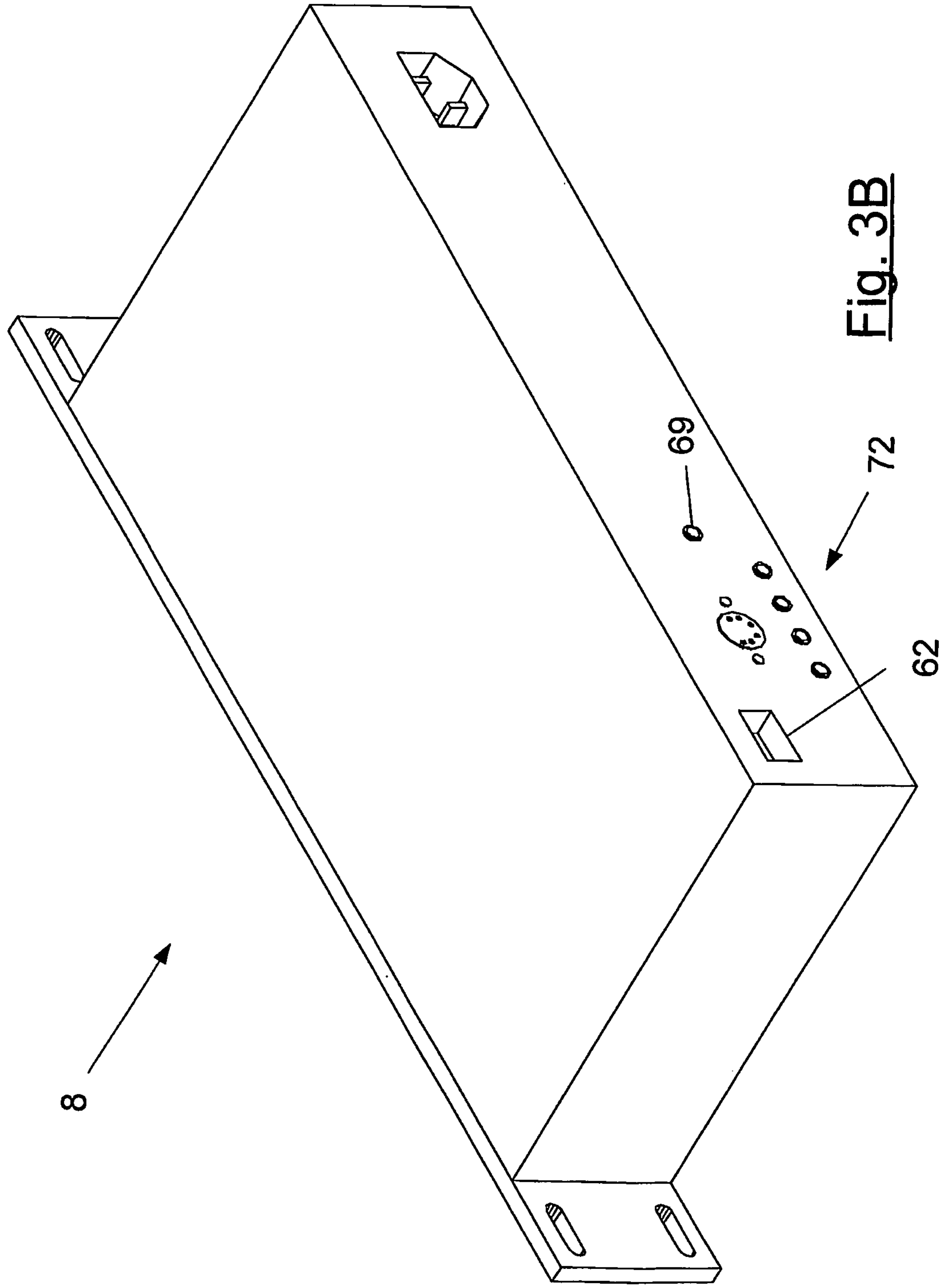
FIG. 3B is a view of the rear of the Amplifier Control Module of FIG. 3A.

FIGS. 3A, and 3B are perspective views of the front and rear of an amplifier control module 8 respectively. The amplifier control module includes an LCD display screen 76 to display its operating status and a microphone connector 74 to provide input signals of ambient acoustic conditions. The rear of the amplifier control module includes a connector 62 for connection to the data network, and various other connectors 72 for connection to one or more power amplifier audio inputs and power amplifier monitoring connectors. A digital output connector 69 is also provided.

Figure 4:
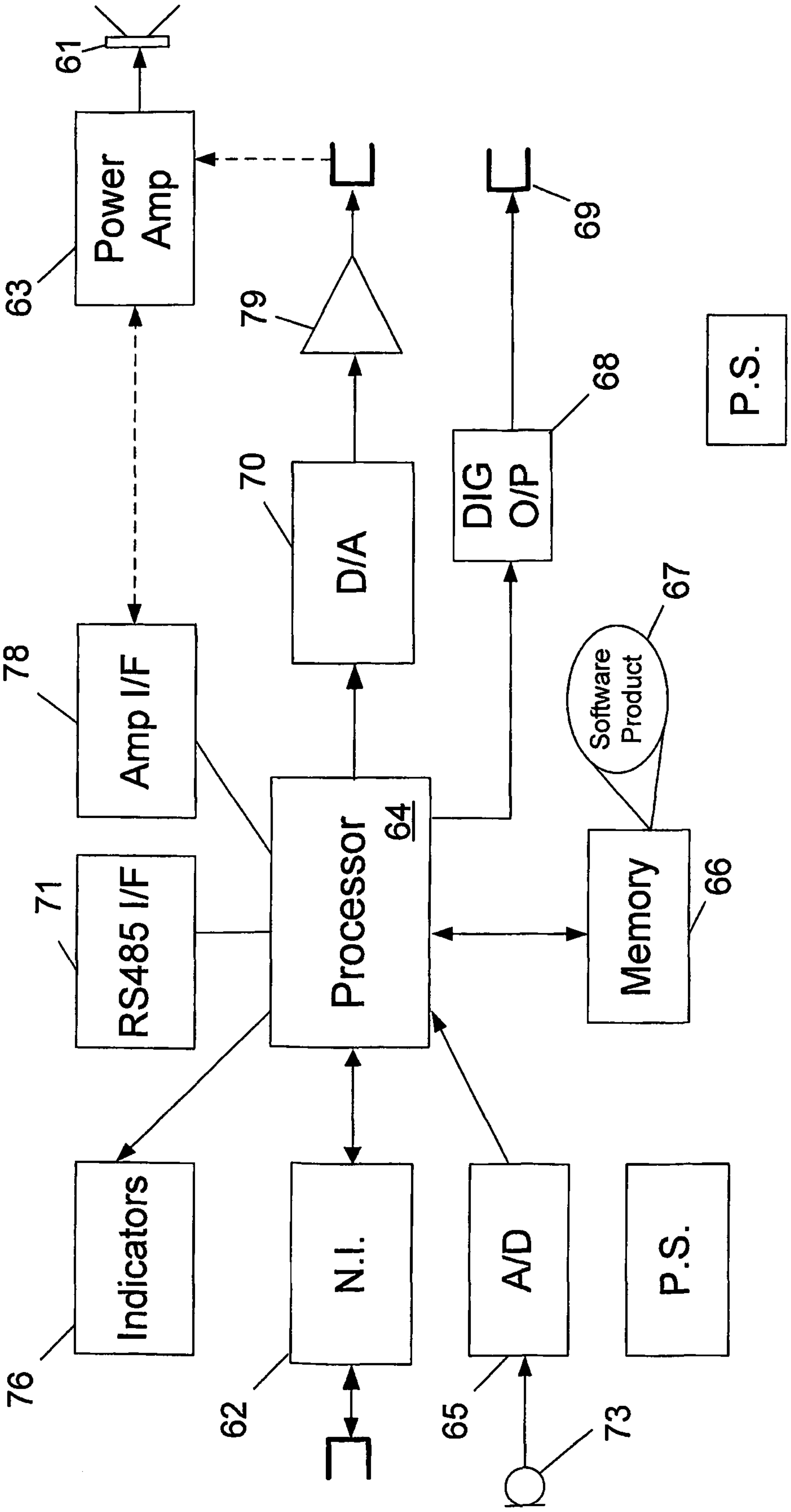
FIG. 4 is a block diagram of the Amplifier Control Module of FIG. 3A.

FIG. 4 is a functional block diagram of amplifier control module 8 according to an embodiment of one aspect of the present invention. Module 8 may be provided as a stand-alone unit in its own housing, as shown in FIGS. 3A and 3B, for connection to a power amplifier 63. Alternatively, it may be built into the housing of the power amplifier. Amplifier control module 8 includes a network interface circuit 62 comprising a Cirrus CobraNet interface with generic Ethernet infrastructure. Data from network interface circuit 62 is passed to microprocessor 64 for digital signal processing. Processor 64 operates in accordance with software/firmware product 67 stored in memory 66 both to perform DSP routines on the signal from interface circuit 62 and for its general functioning on the network. Microprocessor 64 monitors operational sensors built into amplifier 63 via interface 78 to determine parameters such as internal temperature, fan speed and supply rail voltage. Microprocessor 64 also controls important amplifier functions of power amplifier 63 via interface 78 such as power-up.

A microphone 73 (external to the device) and A/D converter circuit 65 are provided in order that processor 64 is able respond to the ambient acoustic environment. The processor is also programmed to perform range checks on the signal resulting from the ambient microphone to ensure the integrity of the ambient sensing system. Digital audio output from processor 64 is converted to an analog signal by DAC 70 and passed to an output amplifier 79 which is in turn coupled to the input of a separate power amplifier 63. The power amplifier drives loudspeaker 61 to deliver the audio signal.

A software/firmware product 67 is stored in memory 66 for execution by microprocessor 64. The program includes instructions for the microprocessor to implement a number of functions.

The major function of amplifier control module 8 is to interpret paging protocol packets from network 6 and to drive speaker 61 to produce paging audio. These processes are described in the flowcharts of FIGS. 4A and 4B.

Program 67 also includes instructions for processor 64 to implement the following functions:

1 Receive background sources and route to channels.

2 Monitor important channel-specific data such as RMS output voltage and current, clip, signal presence, thermal limit, clip protection.

3 Perform signal-processing functions such as speaker/room equalization, target level, phase inversion, mute, compressor/limit and delay.

4 Receive signal from an ambient-sense microphone via connector 74.

5 Perform ambient level compensation and transmit control output from this algorithm over network 6 to other Amplifier Control Modules 8*a*, . . . , 8*n*.

6 Receive page inhibit signals over the network to inhibit the paging function.

7 Receive paging and background control messages from the network to modify operation of the channel.

8 Perform D/A conversion and have a balanced output stage with selectable full-scale output level.

9 Provide a digital output stream in AES/EBU or S/PDIF format by means of digital output interface circuit 68.

10 Provide output to front panel connectors 75 to make signal presence, etc signals available.

11 Generate tone and noise sources, both for commissioning tests, and also for other purposes, such as privacy screening using white noise as a background. Those versed in the art of providing, installing and commissioning audio systems for public or commercial use would be aware of requirements tone and noise generation to facilitate accurate setup of sound levels in such a system. Processor 64 may use known audio processing routines to generate such tones as are generally used to setup levels in such instances. Following commissioning, the tone generation facility may be put to other tasks such as low level white or pink noise generation used for sound masking or privacy screening in areas such as a shared office environment.

Figure 4A:
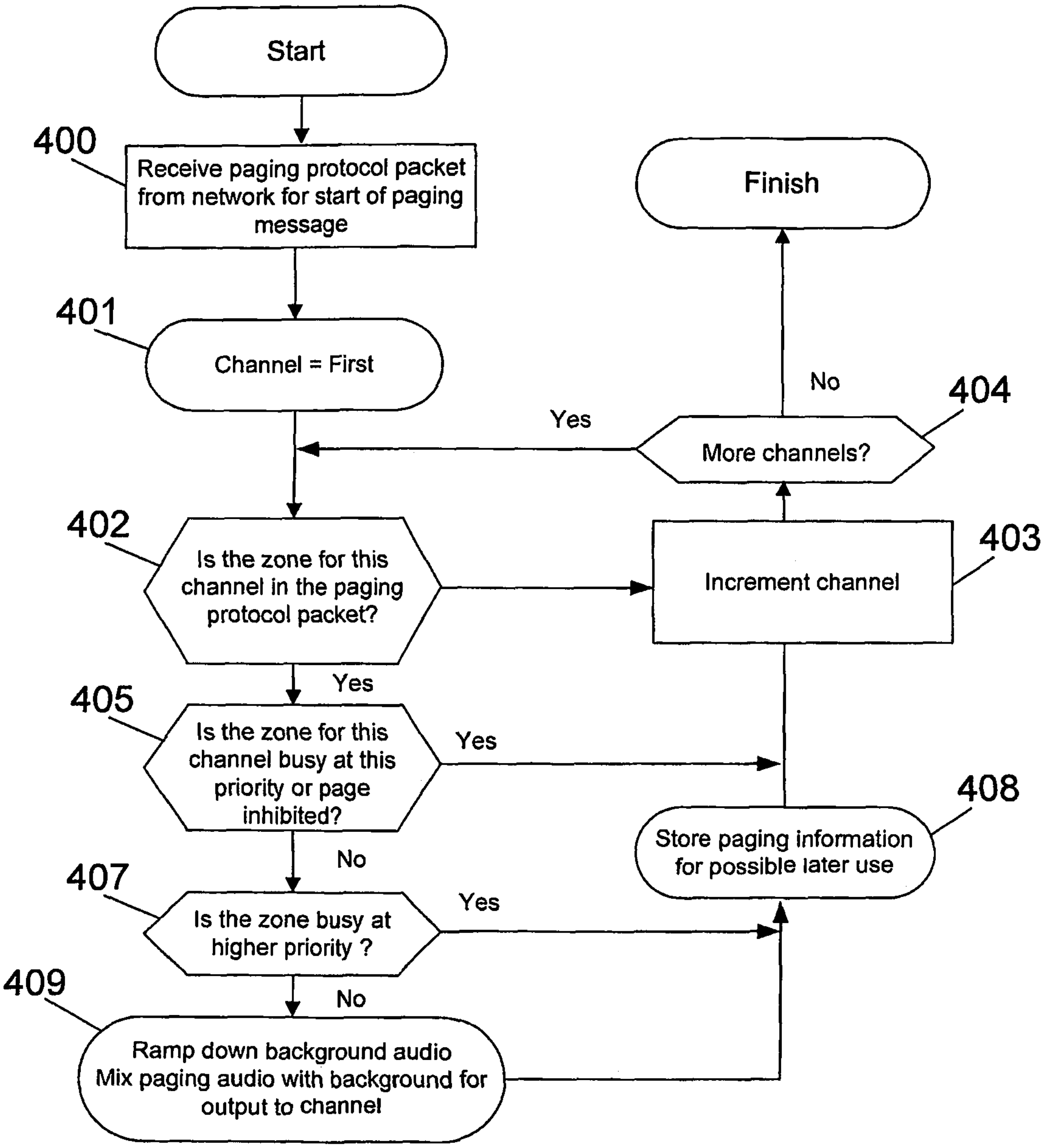
FIG. 4A is a first flowchart illustrating the operation of the Amplifier Control Module of FIG. 3A.
Figure 4B:
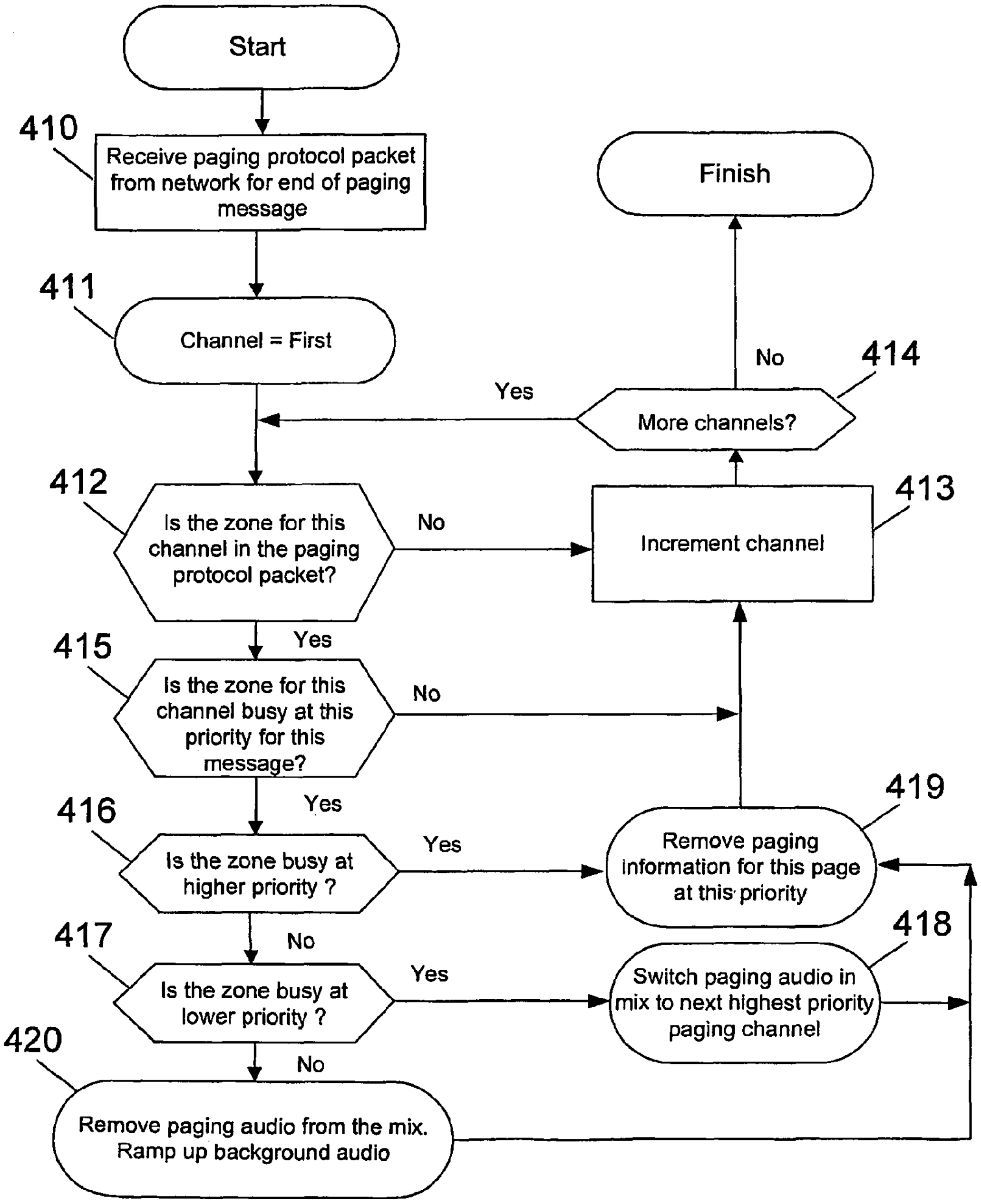
FIG. 4B is a second flowchart illustrating the operation of the Amplifier Control Module of FIG. 3A.
Figure 4C:
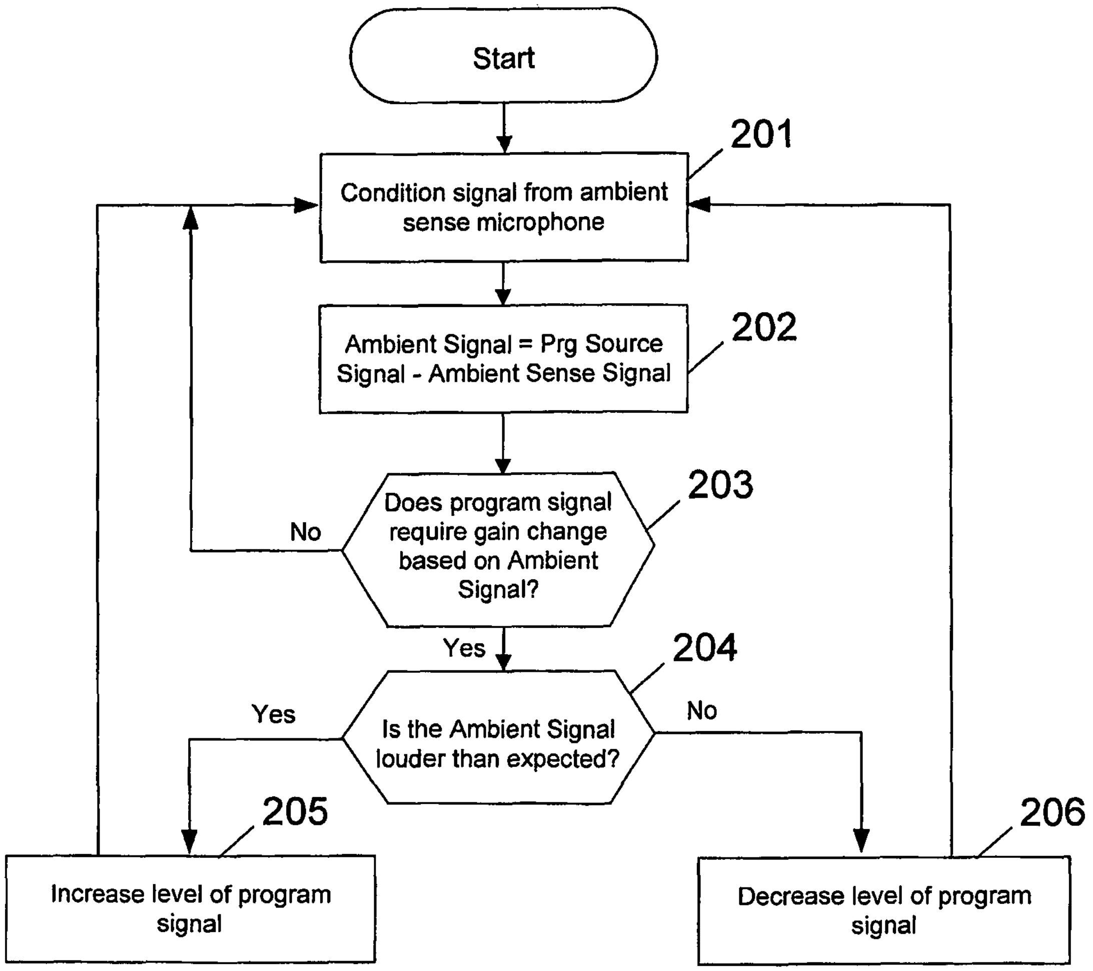
FIG. 4C is a third flowchart illustrating the operation of the Amplifier Control Module of FIG. 3A.

A flowchart of the ambient level compensation program referred to in point 5 above appears in FIG. 4C. The ambient level control program controls the processor of the amplifier control module to vary the gain of an amplified signal based on the ambient level in the acoustic space as measured by an ambient sense microphone 73 (FIG. 4).

At box 201 the signal from microphone 73 is conditioned to the correct level and bandwidth required by the microprocessor. At box 202 the program source signal is then subtracted from the ambient sense signal to leave only the ambient signal. At box 203 the microprocessor compares the received ambient level to the nominal ambient level. If the ambient level is equal to the nominal level, no change to program level is made and control loops back to box 201. Alternatively if the ambient level is not equal to the nominal level then control passes to box 204. If, at box 204, the ambient level is determined to be less than the nominal level then control diverts to box 205 and the program level is reduced by a scaled amount. Control then loops back to box 201. Alternatively, if the ambient level is determined to be greater than the nominal level at box 204 then control passes to box 206 and the program level is increased by a scaled amount.

The loop of tests and adjustments performed at boxes 201-206 ensures that the program signal is continuously monitored and adjusted so that it is neither too loud nor too soft for an acoustic space in which ambient level can dramatically vary.

In multi-channel Amplifier Control Modules, a range of implementations may be offered including:

- individual circuitry for each channel
- the sense mic input may be shared between channels,
- use of plug in option card(s),
- a multiplexed A/D converter
- outboard preamps, RMS and logarithmic converters.

The amplifier control module retains its entire configuration internally in non-volatile memory. As is explained elsewhere, the configuration is uploaded via the Ethernet interface from PC 3 (FIG. 1). Alternately, in the absence of PC 3, the amplifier control module will request configuration from a configuration store implemented in Message Machine 14.

The amplifier control module configuration relevant to the paging application is set out in Table 4.

TABLE 4

| |
|---|
| One byte module ID |
| Audio channel to zone assignment (1 byte per channel) |
| Default background source for each channel - Bundle (2 bytes), audio-channel (1 byte) |
| Page inhibit threshold priority (1 byte per channel) |
| Digital Signal Processing signal chain operating parameters including such things as equaliser settings, levels, default ambient sense levels, ducking level, delay, compressor, limiter and page inhibit default (1 kbyte approx per channel). |
| Amplifier self-test parameter limits including thermal, overcurrent, power output, fan speed, load impedance etc (approx 100 bytes/channel) |
| Power amplifier channel mode eg 70/100 V/Low Z, bridge, parallel. (4 bytes per channel) |

The intelligent Amplifier Control Modules 8_a_, . . . , 8_n_ are programmed to listen for paging control packets that contain zones listed in their channel configurations, implying that there is a page destined for an audio channel in this module. The module is programmed to determine from the packet's zone list, to which channel or channels the audio should be routed. The module's network interface is configured to receive the bundle and audio channel containing the paging audio.

FIG. 4A is a flowchart of the processing that takes place when an intelligent amplifier control module receives a paging protocol packet indicating the start of a paging event.

With reference to FIG. 4A, at box 400 the amplifier control module receives the paging protocol packet indicating the start of the paging message. At box 401 the amplifier control module's processor selects the first channel that it controls. At box 402 the zone to which that channel is assigned is scanned for in the paging packet that has been received. If that zone is not listed, then control diverts to box 403 and the next channel is selected. Alternatively, if at box 402 the zone is found to be listed then control diverts to box 405. At box 405 the channel status is checked for currently active paging at the priority indicated in the message or for inhibited paging. If currently active paging or inhibited paging is indicated then control diverts to box 403 and the channel number is incremented as before.

Alternatively, if at box 405 the zone is not busy for the current channel at the given priority, and the zone is not page inhibited, then control passes to box 407. At box 407 a test is performed to determine if the zone is busy at a higher priority. If the zone is busy at a higher priority then control passes to box 408 where the information is stored for possible later use.

If all of the above checks at boxes 402, 405, and 407 indicate that the page should be played, then at box 409 the amplifier control module ramps down background audio and mixes paging audio with the background audio to allow the paging audio to be heard. Control then passes to box 408 where the paging information is stored for possible later use.

FIG. 4B is a flowchart describing the processing that takes place when an intelligent amplifier control module receives a paging protocol packet indicating the end of a paging event. At box 410 the amplifier control module receives the packet. The first channel controlled by the module is selected at box 411, and the zone to which that channel is assigned is scanned for in the paging packet received at box 412. If that zone is not listed, the next channel is selected at box 413 and the process continues for all remaining channels in the module via box 414. Alternately, if the zone is found to be listed at box 415, then, at box 416, the channel status is checked for currently active paging for the message indicated in the packet. If the zone is busy at a higher level then the information for that page is removed at box 419, and the process continued for the next channel at box 413. If the zone has an active page at a lower priority, the paging audio is switched to that other page, and the old page information removed at box 419. If that page is the only active page, the paging audio is removed and the background ramped back to normal level at box 420, before removing the information for that page at box 419. The process continues for all channels, due to the increment operation at box 413.

Modules 8_a_-8_n_ (FIG. 1) also receive background audio override packets. The modules are programmed to respond to these packets by overriding the default background audio source with another source. This source could be another background music source or a local input.

The modules are programmed to interpret page inhibit packets emanating from the wallplate devices i.e. the Zone Control Panels and the Local Volume Controls (depicted as items 17 and 19 of FIG. 1). These packets inform modules which zones (and hence which specific module channel) will ignore requests for paging to that zone (below the page inhibit threshold set for the channel).

Page Inhibit Packets are of the form set out in Table 5.

TABLE 5

| | | |
|---|---|---|
| Packet Type | 1 | Zone page inhibit |
| List of zones | n | 1 byte per zone |

Finally, the Amplifier Control Modules are programmed to respond to level control packets issued from the zone control panels (ZCP) 17. These specify a zone and the corresponding level. Accordingly, all module channels which are assigned to that zone can be set up simultaneously. Further, more than one level control device (eg ZCP 17) is able to set the level.

At start up, each of Amplifier Control Modules 8*a*, . . . , 8*n* is programmed to transmit an announcement message over network 6. The announcement message contains the volume levels for any zones to which the particular amplifier control module's channels are assigned, together with a timestamp. Any other Amplifier Control Modules, or volume control devices, associated with these zones read the announcement message and either use that setting to update their own, if the message contains newer information, or reply with a later time-stamped message indicating that a new setting has been applied while the module has been offline.

The Audio Level Packet is of the form: [Packet Type (1 byte); Zone ID (1 byte); Time-stamp (4 bytes); Level (1 byte)]

Speaker Load Monitoring Device (SLMD)

Figure 11:
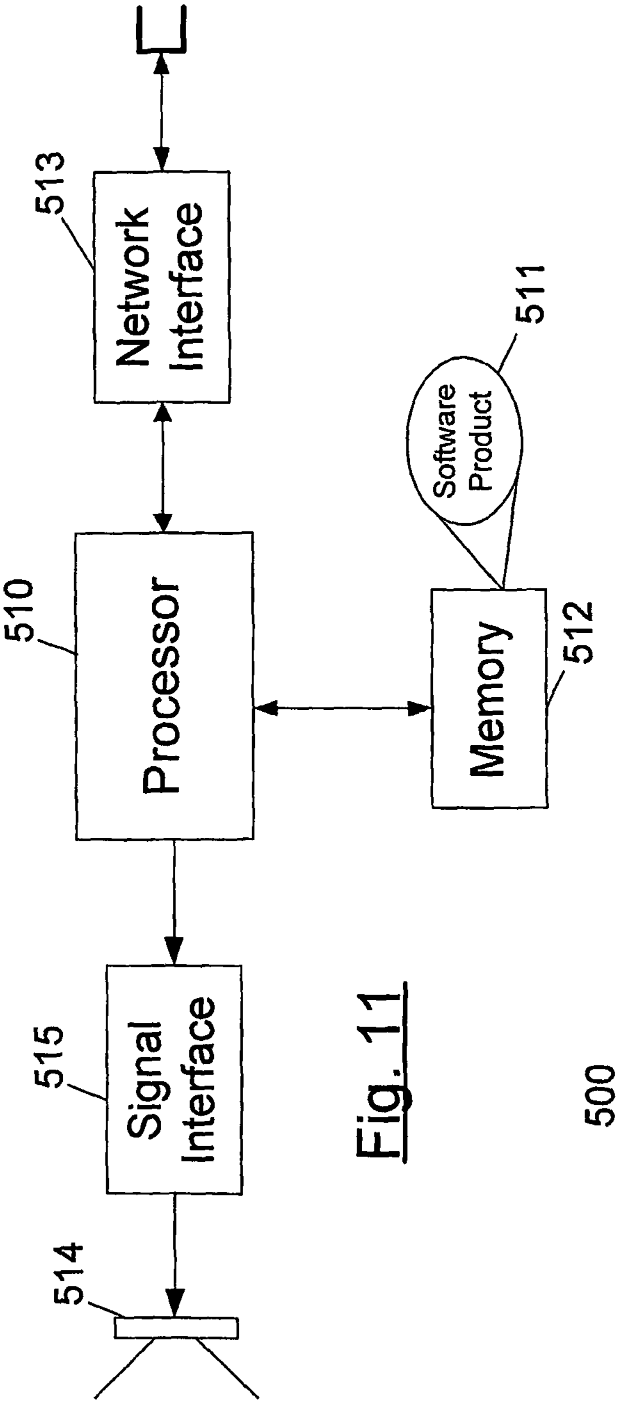
FIG. 11 is a block diagram of a Speaker Load Monitoring Device according to an embodiment of the present invention.
Figure 12:
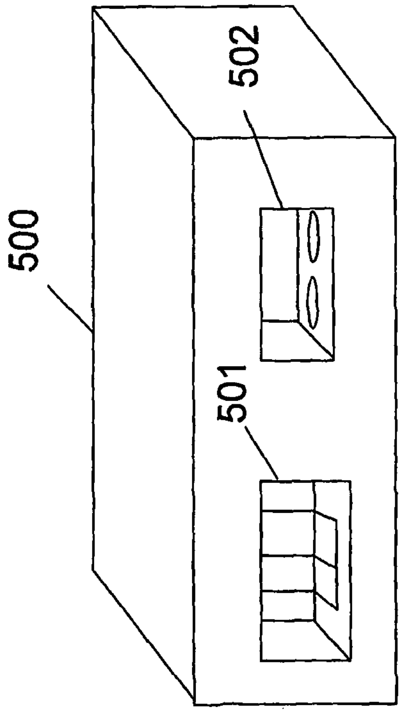
FIG. 12 is a view of the exterior of the Speaker Load Monitoring Device of FIG. 11.

Referring now to FIGS. 11 and 12 there is depicted a Speaker Load Monitoring Device (SLMD). FIG. 12 is a perspective view of the SLMD 500 according to an embodiment of the present invention. The SLMD includes a rectangular casing that houses various signal and data processing circuits as will be explained shortly. An RJ45 socket 501 is mounted into the casing for Ethernet cable connection to network 6. A pluggable screw terminal socket 502 is mounted into the casing for connection to speaker terminals.

FIG. 11 is a block diagram of the SLMD 500. The SLMD includes a processor 510 that operates in accordance with a software/firmware product 511 stored in memory 512. A network interface 513 is provided to interface the processor to network 6. Power for the SLMD is derived from the network connection 513. Processor 510 receives signals from the speaker input socket 514 via a conditioning circuit 515 and sends information to selected amplifier 8 via network 6. The software contains instructions for processor 510 to implement the method illustrated in the flowchart of FIG. 4D.

The SLMD is configured according to a number of parameters as shown in Table 5A.

TABLE 5A

| | |
|---|---|
| Device ID | 1 byte |
| Associated Amplifier | 1 byte |
| Associated Amplifier Channel | 1 byte |

Figure 4D:
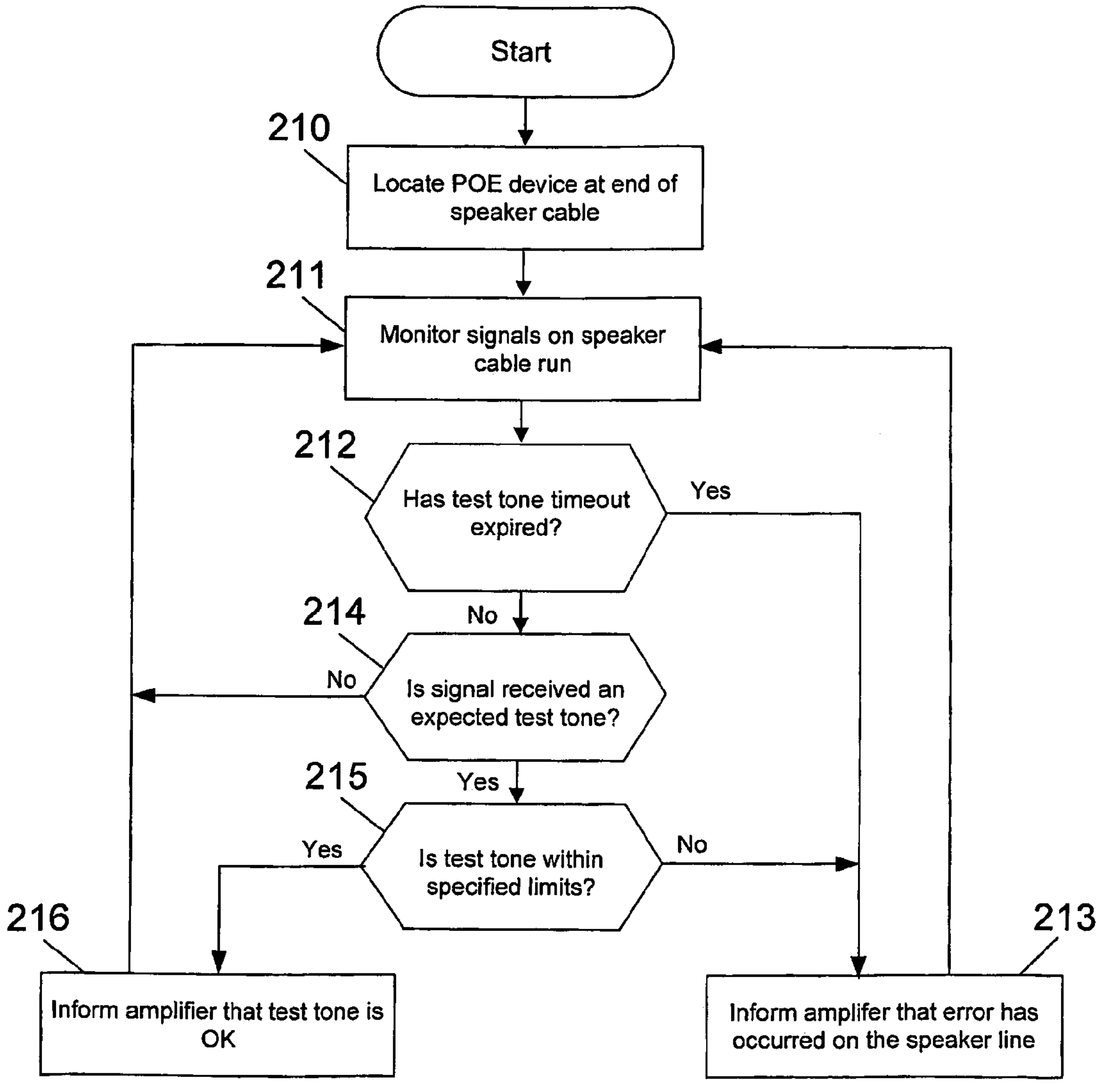
FIG. 4D is a fourth flowchart illustrating the operation of the Amplifier Control Module of FIG. 3A.

As previously mentioned, FIG. 4D is a flowchart of the SLMD that monitors signals on the speaker line 210. Out-of-band test tones are periodically sent from the amplifier over the speaker line to be received by the SLMD at box 211. If a said test tone is not received within a certain period of time 212, the SLMD informs the system that the speaker line or amplifier may have an error 213. Incoming signals are always checked to determine whether or not they are expected test tones 214. If a test tone is received, it is compared to an ideal tone to determine whether or not the speaker line has an error 215. If an error has occurred with the test tone, the SLMD informs the system that the speaker line or amplifier may have an error 213. If the test tone is correct, the SLMD informs the system that no errors have occurred 216. Any anomalous behaviour is stored in an internal log, together with a timestamp to allow accurate diagnosis of fault conditions. All faults are available for interrogation from a central PC running a system monitoring application.

Message Machine

Figure 5:
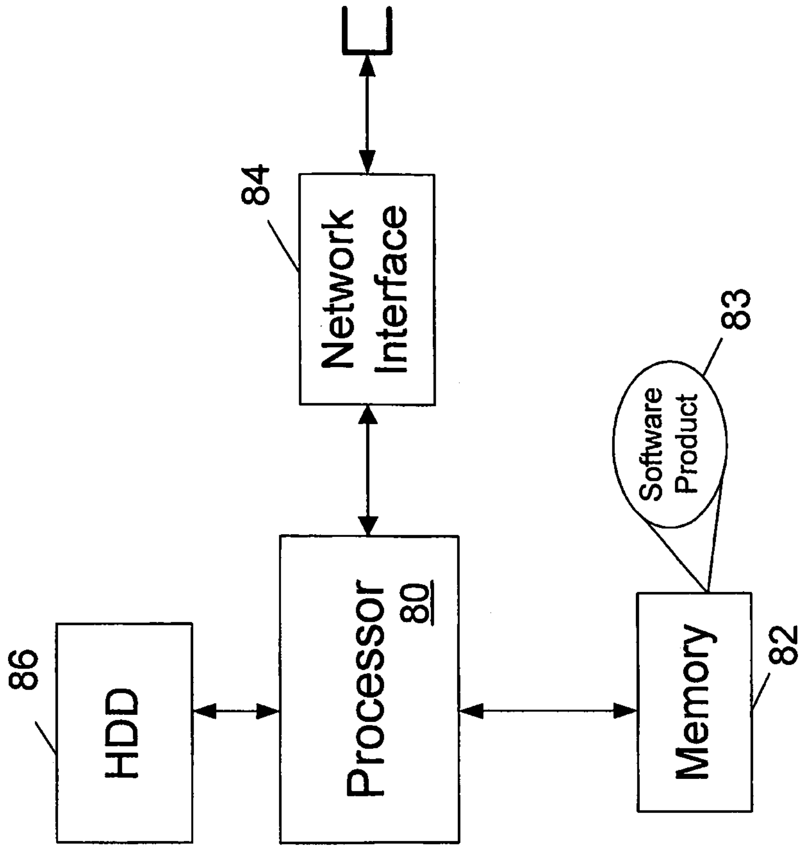
FIG. 5 is a block diagram of a Message Machine according to an embodiment of the present invention.

Referring now to FIG. 5, there is depicted a block diagram of Message Machine 14. The Message Machine is based upon an embedded microprocessor 80 that executes a software/firmware product 83 stored in memory 82 and retrieves and saves messages to non-volatile memory in the form of a hard disk drive or flash file system 86. Microprocessor 80 interfaces to the network by means of CobraNet interface circuit 84. The Message Machine receives requests from the system scheduler 16, or from PSCs, in the form of a recorded announcement request packet.

There may be more than one Message Machine connected to network 6 so each machine is identified using a one byte ID. Message Machines each have a base bundle number, which is used when assigning bundles for recorded message playback.

The Message Machine operates according to instructions contained in a program stored in memory 82. The program assigns bundles to recorded messages in a similar manner to that used to by PSCs 4*a*-4*n* to assign bundles to paging message.

The Message Machine is programmed to monitor the engaged status of each zone in the system and the total number of multicast bundles being used. It delays playback of recorded messages to zones that are engaged at the time the playback request was made. It is also programmed to delay playback if it is desired to use a multicast bundle and there are already too many in use. To perform these functions the Message Machine is programmed to listen to the page control packets coming from PSCs and other Message Machines.

The Message Machine is also programmed to provide a number of other features to enhance the functionality of the paging system. These features include:

1. A scheduler that can autonomously launch messages into the paging system according to a schedule configured by a system operator. The message scheduler is implemented in software as a process that runs on the Message Machine.
2. A configuration store that allows a device in the paging network to be supplied with a configuration record specific to its network identity. This allows devices connected to the network an alternate source for configuration records in the absence of PC 3.
3. A software interface, upon which intelligent third-party applications may make requests, and may launch pages and other processes within the paging system.
4. A software application that allows text segments to be converted into spoken messages.
5. A software application that allows various message segments to be joined into a single paging event for the purposes of making automated messages customised to a specific purpose.
6. A software interface that allows other systems of the type described herein to make page requests within this system.

Local Input Interface (LII)

Figure 6:
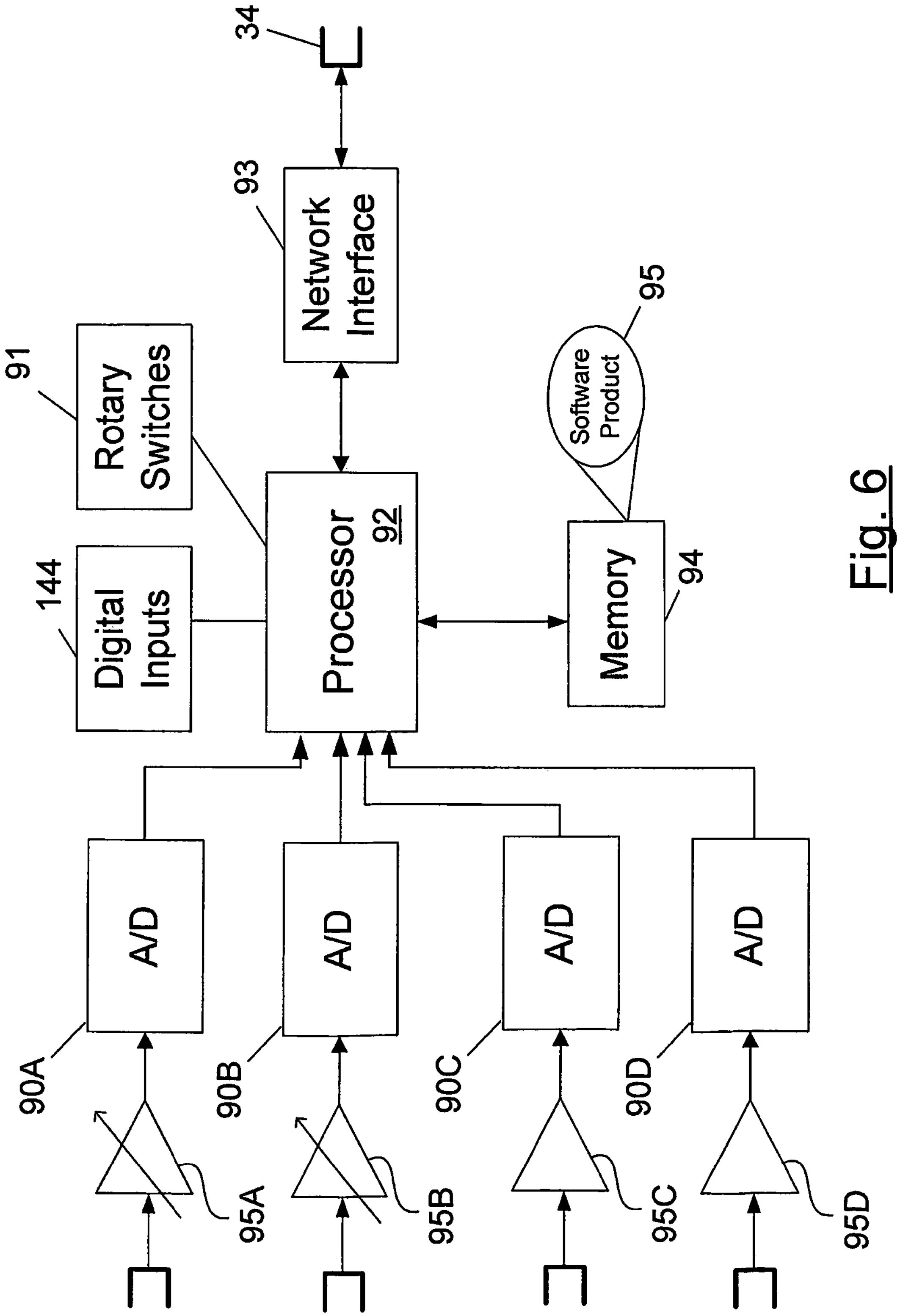
FIG. 6 is a block diagram of a Local Input Interface according to an embodiment of the present invention.

Referring now to FIG. 6, there is depicted a block diagram of a Local Input Interface unit. This unit provides an interface between analog inputs and the CobraNet. They can be configured dynamically to transmit audio on a specified bundle. The bundle may be unicast or multicast. Audio enters the unit through input gain stages 95A-95D and is then digitized in A/D converters 90A-90D before being input to microprocessor 92. Microprocessor 92 executes software/firmware 95 stored in memory 94 in order to implement basic DSP functions and to format the audio into CobraNet bundles before passing it to network 6 (FIG. 1) via network interface 93. Rotary switches 91 are provided for an operator to set device identification parameters.

Figure 6A:
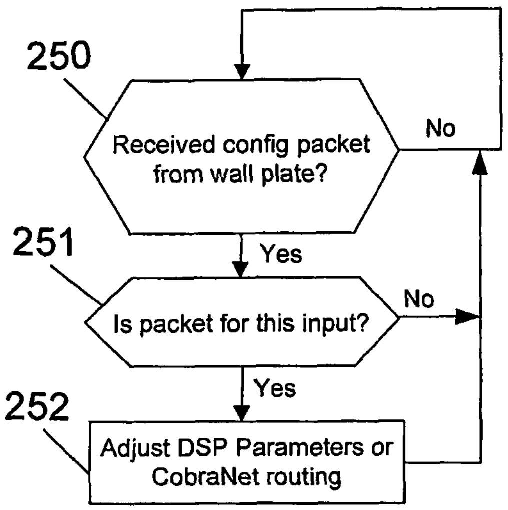
FIG. 6A is a flowchart illustrating the operation of the Local Input Interface of FIG. 6.

Local Input Interface units are able to change their operation in response to a local input request packet received from a wall-plate device via the process described in the flowchart of FIG. 6A. At boxes 250 and 251 the processor of the input interface unit waits for instructions from another control source, such as a DID. At box 252 the processor adjusts its internal DSP parameters, e.g. input gain or equalization or the CobraNet bundle/channel on which it is transmitting accordingly.

Local Input Interface units may also respond to local digital inputs 144 to enable transmission in response to a contact closure. In this case it will be possible for the input interface unit to transmit periodic page control packets to instruct Amplifier Control Modules 8 of FIG. 4 to listen to the local input audio.

Background Music Unit (BMU)

A Local Input Interface is used as the basis for a Background Music Unit (18, FIG. 1). The BMU interfaces third-party audio sources (eg off-air tuner, CD player, MP3 Jukebox, satellite distribution system etc) to network 6. Configuration settings within the unit allow these audio sources to be used as background music sources within the paging system.

The BMU configuration is set in accordance with a number of parameters as shown in Table 6.

TABLE 6

| | |
|---|---|
| Device ID | 1 byte |
| Bundle | 2 bytes per channel |
| DSP parameters including such things as equaliser settings, levels, compressor and limiter. | 500 bytes per channel |

Zone Control Panel (ZCP)

Figure 7:
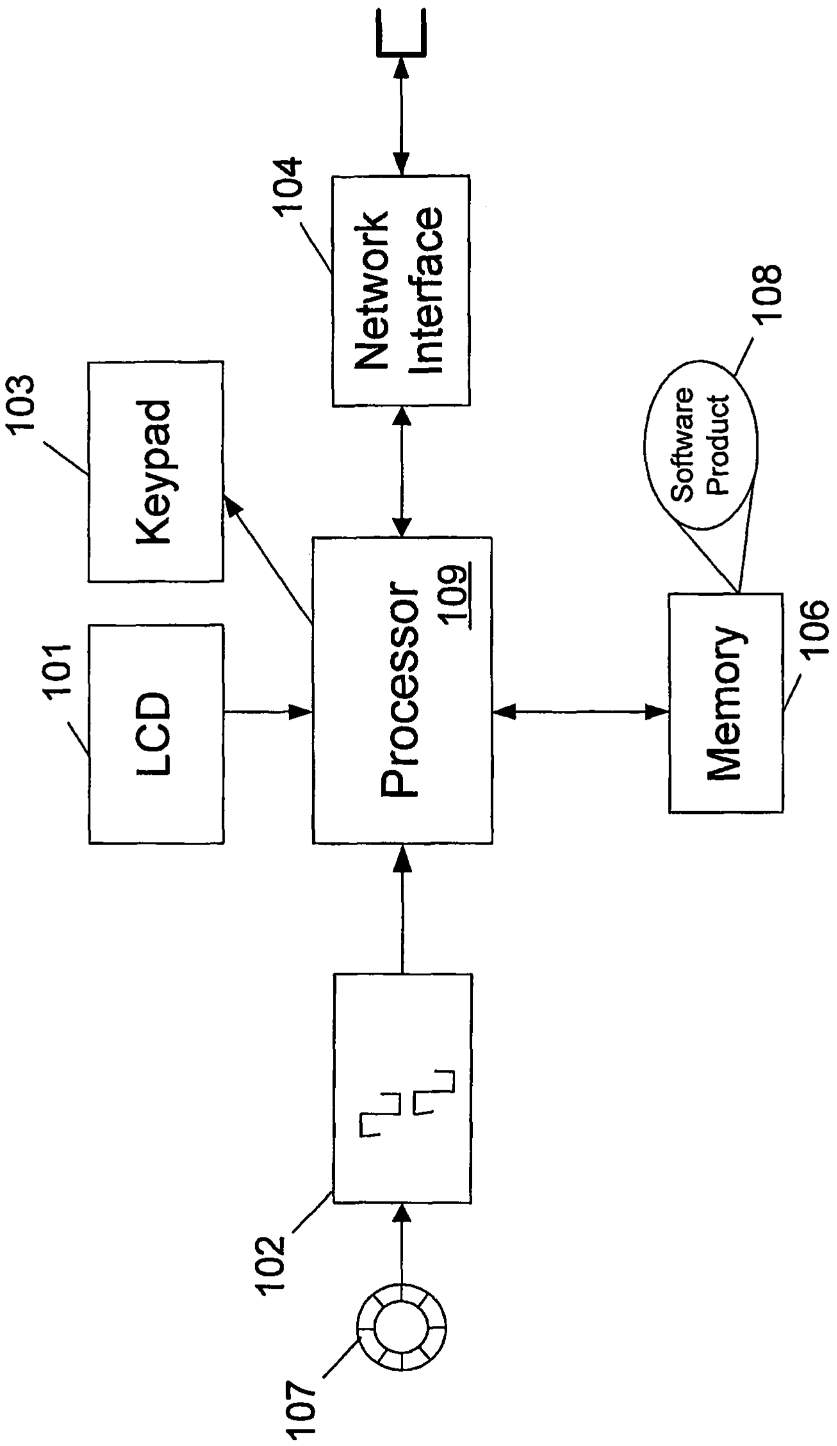
FIG. 7 is a block diagram of a Zone Control Panel according to an embodiment of the present invention.
Figure 7A:
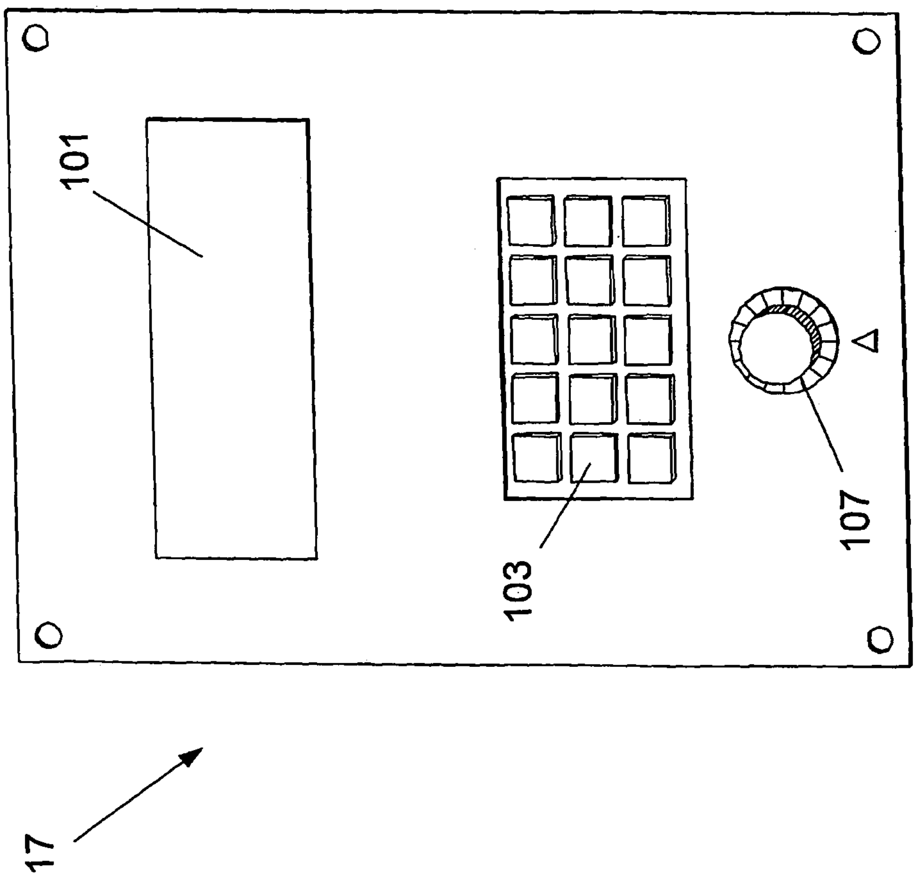
FIG. 7A is a view of the front of the Zone Control Panel of FIG. 7.
Figure 7B:
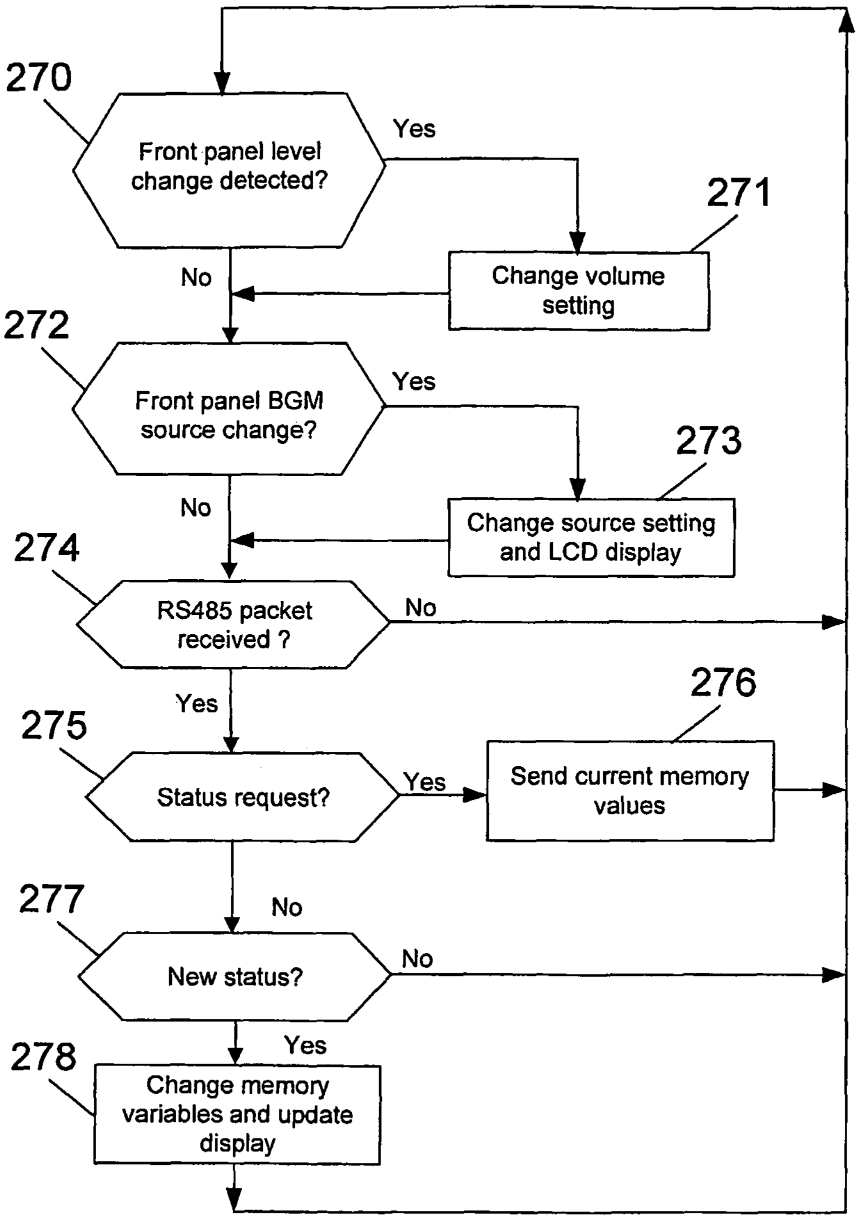
FIG. 7B is a flowchart illustrating the operation of the Zone Control Panel of FIG. 7.

Referring now to FIGS. 7 and 7A, there is depicted a Zone Control Panel wallplate 17 that connects to network 6. The ZCP includes a processor 109 that operates in accordance with a software/firmware product 108 stored in memory 106. Processor 109 receives level adjustments from rotary encoder 102 in response to rotation of knob 107 by an operator. The processor is also responsive to a keypad 103, to receive operator selections, and drives an LCD 101 to display messages and operational status to the operator. A network interface 104 is provided to interface the processor to network 6.

The ZCP's user controls, i.e. encoder 102 and keypad 103, provide a means for an operator to modify certain parameters in respect of particular paging zones. These parameters include background level, background source and page inhibit. The user controls include a rotary encoder 102 for setting levels, buttons 103 for source selection and page inhibit and an LCD 101 to display background music source selections. Referring to flowchart 7B, the processor software looks for control input changes at boxes 270 through to box 273 or requests over the network 275 which may either be a request for current state 276 or an instruction to change state 278.

The ZCP is configured according to a number of parameters as shown in Table 7.

TABLE 7

| | |
|---|---|
| Device ID | 1 byte |
| Zone | 1 byte |
| Number of background sources | 1 byte |
| Background description list | Dependent on number of sources |

Local Volume Control (LVC)

Figure 8:
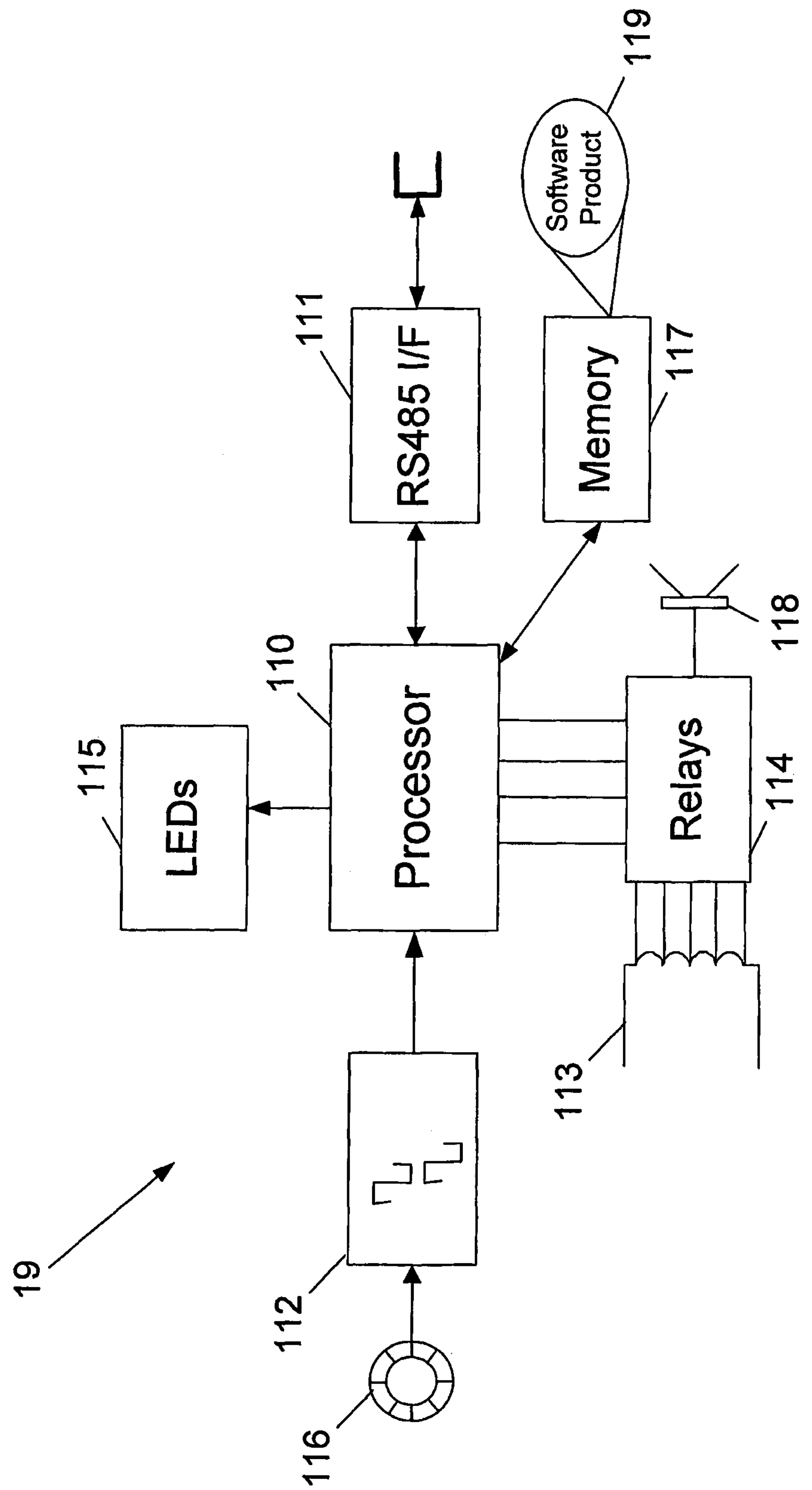
FIG. 8 is a block diagram of a Local Volume Controller according to an embodiment of the present invention.

FIG. 8 is a block diagram of LVC wallplate 19. The LVC is built around microprocessor 110 which operates according to software/firmware 119 stored in memory 117. The processor is connected to an RS485 network interface 111 that communicates with a network hosted by RS485 interface 71 (FIG. 4) contained within amplifier control module 8. Processor 110 receives operator adjustments via knob 116 and rotary encoder 112. The processor also drives an operator display comprising a number of LEDs 115 and operates a number of relays 114 to change the tap of transformer 113 to which loudspeaker 118 is connected. The output of power amplifier 63 is coupled to the input side of transformer 113.

The amplifier control module is programmed to issue control packets to the RS485 network to control the LVC. These control packets can be used to instruct the LVC to change which transformer taps are selected.

LVC wallplates control level on individual speakers connected to an amplifier channel according to software product 117. The software contains instructions for processor 110 to implement the method illustrated in the flowchart of FIG. 8A. LVC units achieve this by changing taps on autotransformer 113 using relays 114 (or equivalent switching element) under the control of a microprocessor 110. The LVC is wired to the speaker cabling via transformer 113 and RS485 cabling via RS485 interface 111 of a single amplifier channel.

Figure 8A:
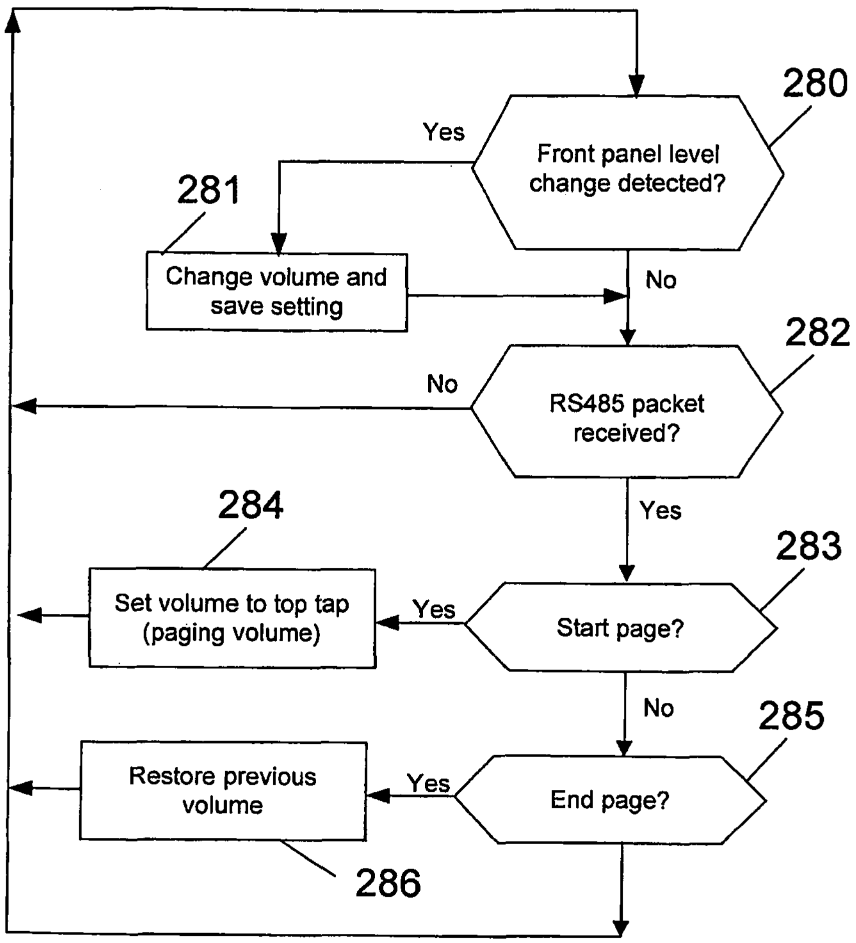
FIG. 8A is a flowchart illustrating the operation of the Local Volume Controller of FIG. 8.

The LVC facilitates user adjustment of speaker level by use of knob 112 (FIG. 8A 280, 281). The current level setting is indicated via LEDs 115 on the front panel.

An LVC can receive instructions via a packet received from the RS485 interface 111, 282. In response to a packet indicating that a page is active on the controlling amplifier channel 283, the LVC selects transformer taps to give maximum volume on the associated loudspeaker 284. A corresponding packet indicates the end of said page 285. On receipt of this packet, the LVC resumes its state prior to the start of the page 286.

Digital Interface Device (DID)

Figure 9B:
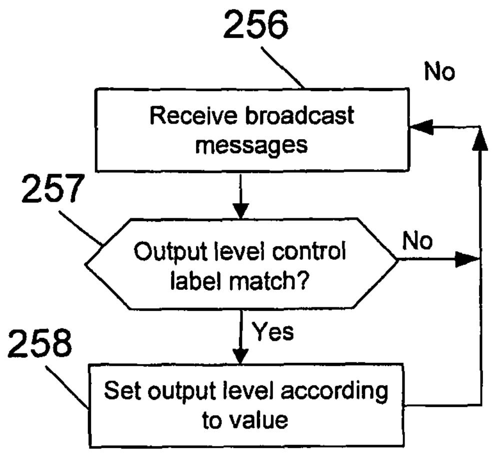
FIG. 9B is a second flowchart illustrating the operation of the Digital Input Device of FIG. 9.
Figure 9A:
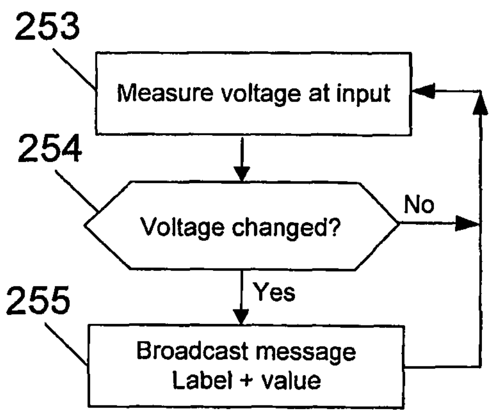
FIG. 9A is a first flowchart illustrating the operation of the Digital Input Device of FIG. 9.
Figure 9C:
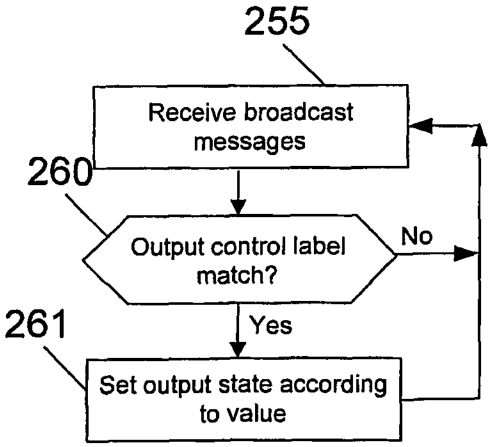
FIG. 9C is a third flowchart illustrating the operation of the Digital Input Device of FIG. 9.
Figure 9:
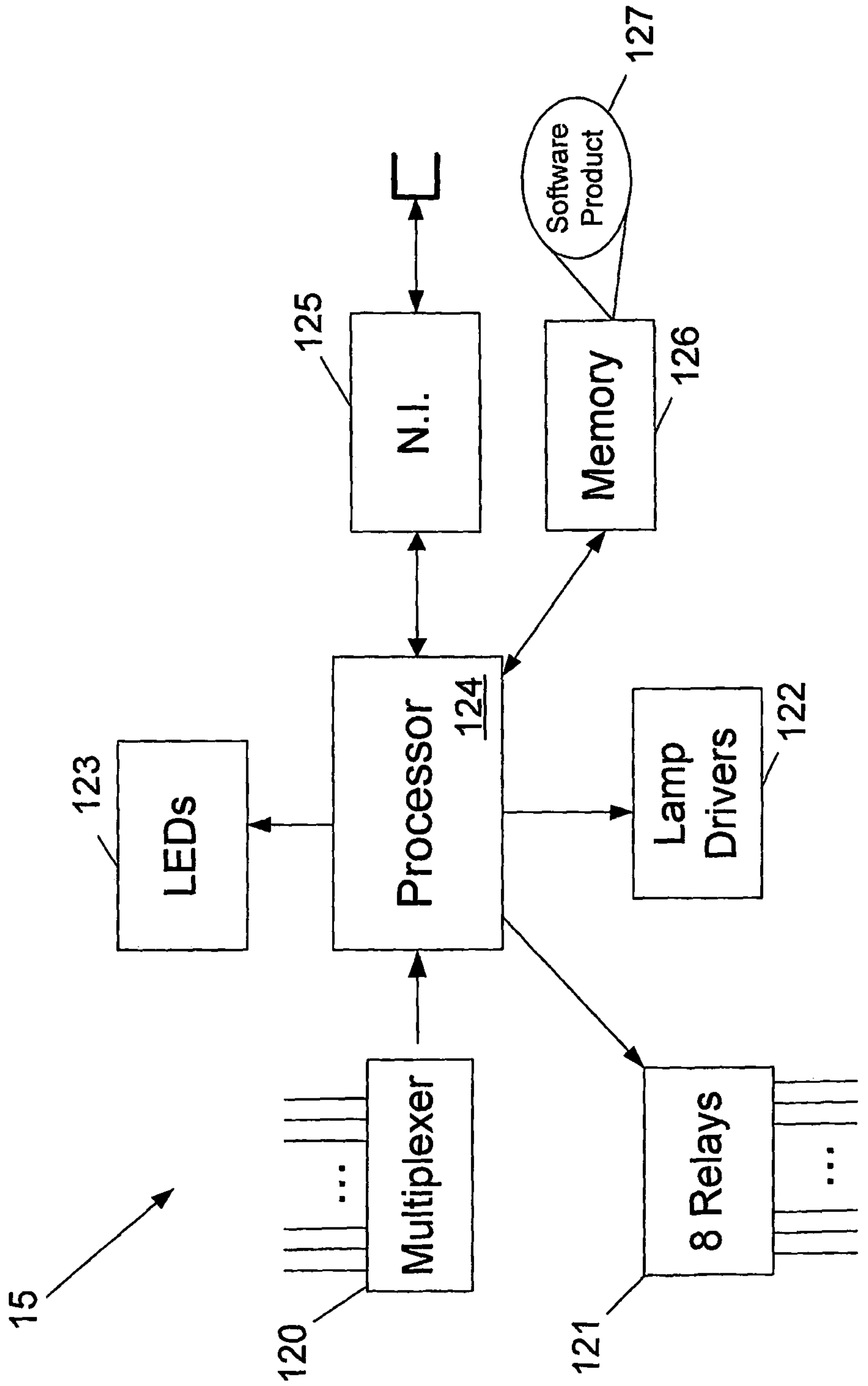
FIG. 9 is a block diagram of a Digital Input Device according to an embodiment of the present invention.

FIG. 9 along with the flow charts of FIGS. 9A and 9B illustrate the control of an intelligent amplifier's output level using one of the DID's voltage control inputs. Referring now to FIG. 9, there is depicted a block diagram of a Digital Interface Device (DID) 15. The DID is built around a microprocessor 124 that operates according to a software product 127 stored in memory 126. The processor communicates with network 6 via network interface circuit 125 and receives commands via eight voltage control inputs of multiplexer 120. Processor 124 controls the switching of eight software controlled relay contacts 121 (both normally open and normally closed connections are made available) and two life-safety monitored lamp driver circuits 122. An LED display 123 is provided for microprocessor to indicate operational status.

The voltage control inputs on multiplexer 120 make provision for switches, potentiometers, or voltage sources to be connected to the system. A 'weak' pull up resistor (>1M ohm) is provided on each input so that switches may be fitted between the input and 0V reference pin. Each input may be uniquely identified using a user definable label. The label consists of no more than 20 alpha-numeric characters.

FIG. 9A is a block diagram showing the operation of the DID in response to voltage at the control inputs. At box 253 the voltage at the input is measured and looped back through box 254 until a voltage change is detected. In the event of a change, at box 255 the DID is programmed to broadcast to network 6 along with the associated label. The voltage range measured at each input is represented using a value that ranges from 0 to 255. These broadcast values may be used to signal an alarm, control volume of some audio input or output and so on.

In FIG. 9B box 256, an amplifier control module listens for broadcast messages containing a label matching that associated with its output level control. If such a message is determined to be received at box 257 then at box 258 the DID will use the value contained therein to set the level control for the appropriate amplifier channel.

The lamp driver circuits are capable of driving an incandescent lamp or multi-chip LED. The lamps are turned on and off in response to messages received from the CobraNet. The messages must contain a label that uniquely identifies the lamp output on this particular DID and in addition the desired state of the lamp (eg. 0—lamp off, 1—lamp on).

The lamp outputs are monitored for both open and short circuit conditions of the external device and produce alarms broadcast to the system when either condition is detected. The message incorporates a label that uniquely identifies the DID and its lamp output, as well as the fault condition (eg. 0—no fault, 1—output shorted, 2—output open circuit).

The DID relay outputs 121 are turned on and off in response to messages received from the CobraNet. The messages must contain a label that uniquely identifies the relay output on this particular DID and in addition the desired state of the relay (eg. 0—lamp off, 1—lamp on).

FIG. 9C is a flowchart depicting the method by which both the lamp and relay outputs are operated. In FIG. 9C, at box 259, the DID listens for broadcast messages received from its network interface 125 (FIG. 9). The DID accepts messages containing labels matched to its relay or lamp outputs at box 260. It uses the contents of such messages to set the state of the appropriate output (ie ON or OFF), as indicated at box 261. The DID then returns to listening for further broadcast messages.

Configuration Software

As was mentioned in relation to FIG. 1, a separate PC running a system configuration software product according to an embodiment of the present invention is used to define the entire paging network. The software product includes instructions to display a graphical user interface (GUI) and instructions to respond to user adjustment and selection of controls and menus displayed in the GUI. Every device connected to the network is displayed as an object within the GUI. The workspace within the GUI is used to place instances of each piece of equipment and logical connections are made between the devices to group them together into zones, tie them together according to RS485 cabling for example and to create other logical associations as appropriate.

Each device on the network is visually represented in the GUI along with user adjustable controls. The software product contains instructions to respond to a user click upon an icon representing a PSC for example by presenting adjustable controls and menus to edit definitions of the zone destinations, preamble bells, and an optional list of wave files to be played when each button of the PSC is pressed. Opening the device icon for a LVC will allow the assigned zone to be specified. Opening a Message Machine will allow the list of .WAV files to be created, and also the system schedule to be defined. Opening an amplifier control module will allow the operating parameters, equalisation curves, zone assignments, levels etc to be set for each channel. Other devices will display similar parameter definition pages as appropriate.

The software also contains instructions for the GUI to facilitate the definition of network topology and network switch hardware.

A typical sequence of events to configure and deploy the system is as follows:

Initially, the user of the GUI defines all devices in the system by selecting appropriate multiples of the available device elements for the system from a menu. These devices will be placed within a workspace. The user may then assign identifiers to each device.

Logical connections are made between devices, such that zone control devices are associated with zones, local volume controllers are associated with amplifier channels, amplifier channels are associated with zones etc.

Each device placed on the workspace provides access to a properties page associated with that device which allows the user to specify each of the parameters required within the configuration record of the devices as described above. The entries made to the properties page provide the logical connections which link devices. e.g. A paging zone is assigned a number through its properties page. A ZVC is assigned a zone number through its properties page. An amplifier is assigned a zone number through its properties page. If all of these are assigned the same zone number they will be logically connected, as they are now all part of the same paging zone.

The properties page for a system element will display the same fields as shown in the configuration record described above for that element. The properties page provides appropriate controls for modifying each of these fields according to the type of data specified by each field. It is hence a directly user-accessible means of modifying a device configuration record.

After making adjustments to the configuration of all of the network devices a user of PC 3 initiates a compilation phase. The compilation phase starts with a sanity check to make sure that all devices are defined and configured appropriately, all linkages are defined, and that there is sufficient network capacity to perform the required routing. Following satisfactory completion of said checks, configuration records will be created for all devices in the system.

At this point, it is possible to connect the machine containing the configuration records to the network of the installation and issue a command to configure the devices on the network. Initially, a broadcast command will be sent to ensure that all audio paths are muted so that no audible anomalies are created during the commissioning process. Following this a discovery process will be undertaken. This will ensure that all devices found in the system have appropriate definitions.

The devices can then be configured using the stored configuration records from the compilation stage. Each device will receive the configuration and store it away in non-volatile storage. This is the "static" or default configuration for each device. In the absence of any dynamic modifications due to paging activity, this configuration defines what each device will do.

Configuration Process

1. The GUI defines the system in its entirety.
2. All devices that have been installed can be identified (Device Id, Device Type).
3. The user can specify which devices to set up, via the GUI.
4. The user initiates the set up process using a control on the GUI.
5. The set up process, once initiated, runs autonomously.
6. The GUI provides information about the progress of the set up procedure. Success or failure of the configuration record transfer to a particular device will be logged.
7. A checksum will be calculated for each device configuration record. This will be used to confirm the efficacy of the transfer.

Figure 10:
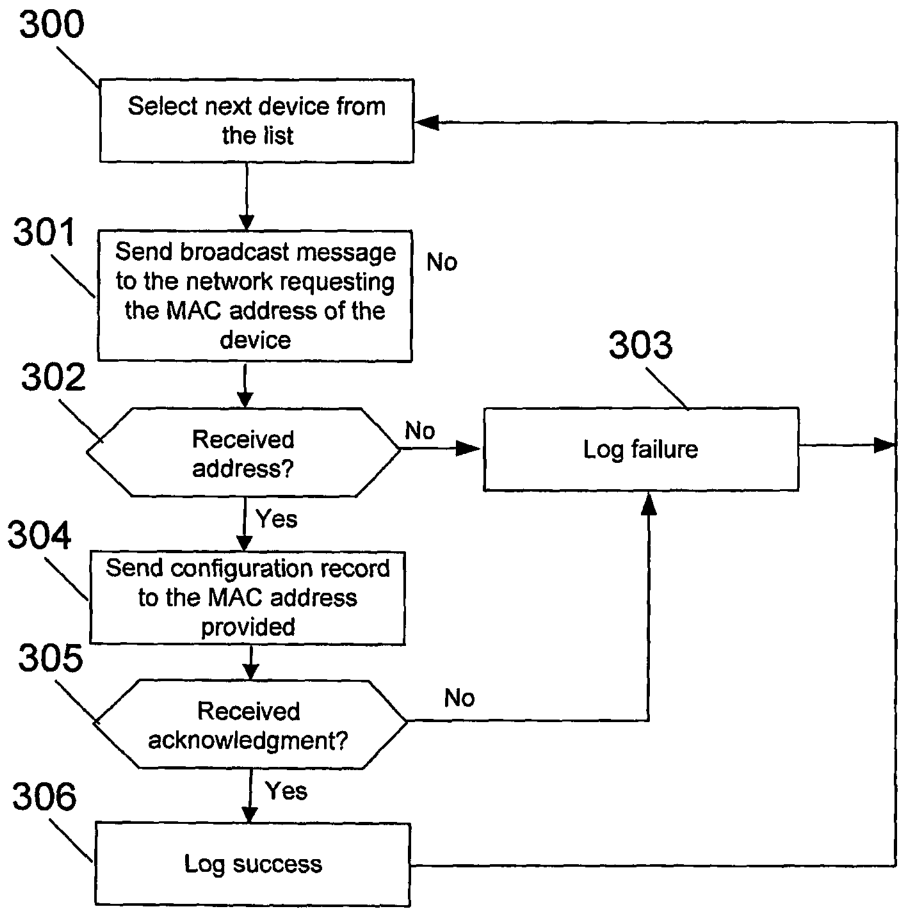
FIG. 10 is a flowchart illustrating a method according to an embodiment of the present invention for configuring devices attached to the network of FIG. 1.

For each device specified in step 3 a procedure is followed as illustrated in the flowchart of FIG. 10. The GUI obtains the ID and type for the device selected at box 300 of from the stored configuration records. This information is used to construct a message that is broadcast to the network at box 301 requesting the MAC address of the device. The GUI waits for a response from the device containing the MAC address requested, block 302. If the response is not received within an appropriate amount of time the GUI will log a failure to configure that particular device and continue the process from box 300.

If the GUI does receive a response from the device, the GUI will then send the appropriate configuration record for that device along with the checksum calculated for that record. The device, having received the record successfully, will acknowledge its receipt. If the GUI receives this acknowledgement it will log a successful configuration transmission at box 306, otherwise it will log a failure at box 303. The process continues through box 300 until all the list of devices has been exhausted.

In addition to configuring the field devices, the configuration records are also stored by a configuration server process contained within the Message Machine. This will allow devices to obtain a configuration record from an alternate source on the network should it be replaced in service, and the original configuring PC not be available.

Once a device has been configured (by receiving and implementing its configuration record), it is free to start running. Safety of the system will be maintained by ensuring that the configuration process configures output devices such as amplifiers last, by which stage all input devices will be set to a sensible state.

Once the system configuration stage is complete, the system is then active. At this time, the PC containing the configuration is no longer required for correct system operation under normal circumstances. The PC may be removed from the system. It will then be possible to use paging stations, local inputs and wallplates to control system operation.

Additionally, PC 3 is able to run a monitoring application which allows a supervisory user of the system to determine the health of all components of the system. This is achieved using an in-built feature of each of the system components. As described more completely for the PSC above, all devices in the system constantly monitor their own health and maintain a table of their current status, and a log of timestamped changes that occur over time to that status. The monitoring application provides two levels of functionality. First of all it polls each device using protocols communicated via the network. Any device that fails to respond to the poll can be immediately marked as having a fault. At a second level, a device that responds to the poll will indicate in a return packet the state of all of its monitored conditions. These monitored conditions are then displayed in a fashion suitable for interpretation by a human operator, using a graphical user interface of PC 3. A further feature of the monitoring application is the ability to request, using protocols running on the network, the internal timestamped log of the device. This log may then be displayed in similar fashion on the GUI, to allow an operator to obtain further information about the history of the device over time. This feature monitors that the component is monitoring properly and is able to report that proper functioning to the monitoring application.

This specific status-monitoring feature addresses the requirements of public announcement systems used in life-safety applications which previously have not been a feature of general-purpose paging systems. This requirement relates to guaranteed notification of failures of any component of the system which may compromise system performance in the event of an emergency requiring the system to perform announcements under emergency conditions. Due to the nature of the system topology, the entire paging system is then not subject to any central points of failure. Failure of a PSC or ACM will affect particular paging sources or destinations only. Failure of the Message Machine will stop pre-recorded messaging, unless multiple units are fitted, in which case the system will continue seamlessly (albeit with reduced capacity).

A further function of the GUI software is to allow runtime supervision of the system. It will be possible to have the GUI interact with a running system to inspect such parameters as metering in amplifiers, selections made on paging stations and ZCPs, and the current activity of background sources and Message Machines. This is achieved using protocols running on the network to request the current operating state, and any changes to that state over time. Further protocol messages allow the remote control device to actually change the operating state of a device, to allow, for example, the remote operator to make selections on a PSC or ZCP, or perhaps change the level of an amplifier. Those implementing such a system will observe that all parameters may be manipulated in this fashion.

It is also possible to monitor traffic levels on given links in the network, and interrogate system logs accumulated by the individual devices during operation. The system may be remotely controlled by running the GUI in an intervention mode that allows an operator to push buttons remotely on paging station and wall panel front panels. The protocols used by the GUI are IP-based. As a result of the fact the IP protocols are routable, the remote control function could be from a very remote location indeed, even accessible from the internet if desired.

The embodiments of the invention described herein are provided for purposes of explaining the principles thereof, and are not to be considered as limiting or restricting the invention since many modifications may be made by the exercise of skill in the art without departing from the scope of the invention.

The invention claimed is:

1. A decentralized public address paging system including:

a combined data and digital audio network;

a plurality of public address paging system consoles, each including an operator interface to select one or more paging destinations and arranged to transmit data packets including paging destination data across said network; and a number of public address addressable amplifier modules in communication with said network and responsive to the data packets, each of said amplifier modules having an associated address and is arranged to operate according to whether paging destination data contained within the data packets relates to said associated address characterized in that each paging system console is configured to listen to page control data packets received from other paging devices on the network to generate an engaged paging destination set and resolve the simultaneous transmission of data packets to the same paging destination using priority whereby paging system consoles transmitting lower priority data packets locally store the packets for later forwarding; and wherein the engaged paging destination set is a set of destination zones for currently active paging events.

2. A decentralized public address paging system as claimed in claim 1, wherein each paging system console further includes a microphone for receiving audio, and an A/D converter for converting the received audio to digital data for inclusion with the data packets.

3. A decentralized public address paging system as claimed in claim 2, wherein each paging system console further includes a push to talk (PTT) actuator for enabling transmission of the data packets.

4. A decentralized public address paging system as claimed in claim 1, wherein each paging system console further includes a microphone monitor for monitoring whether a microphone is functioning correctly.

5. A decentralized public address paging system as claimed in claim 4, wherein the microphone functions correctly when a received audio signal level input to the microphone exceeds a predetermined threshold.

6. A decentralized public address paging system as claimed in claim 4, wherein each paging system console includes a means for controlling the gain of the microphone based upon the input audio signal.

7. A decentralized public address paging system as claimed in claim 1, wherein each paging system console includes a keypad for entering user data and a display for displaying the user data.

8. A decentralized public address paging system as claimed in claim 7, wherein each paging system console is of a generally tapered shape so as to define a face including the keypad and the display.

9. A decentralized public address paging system as claimed in claim 1, wherein each paging system console includes address setting means for setting a unique network address of the console.

10. A decentralized public address paging system as claimed in claim 1, wherein the network is an Ethernet or Local Area Network (LAN).

11. A decentralized public address paging system as claimed in claim 1, wherein each amplifier module includes a display for displaying the operating status of the amplifier module.

12. A decentralized public address paging system as claimed in claim 1, wherein each amplifier module includes a microphone input to receive ambient audio.

13. A decentralized public address paging system as claimed in claim 1, wherein each amplifier module includes one or more power amplifiers each for interfacing with a respective speaker.

14. A decentralized public address paging system as claimed in claim 13, wherein each speaker, or group of speakers, in use outputs audio sent over a respective audio channel.

15. A decentralized public address paging system as claimed in claim 1, further including one or more message machines for retrieving message data packets from respective storage mediums.

16. A decentralized public address paging system as claimed in claim 15, wherein each message machine has a unique identifier by which it can be identified during communications.

17. A decentralized public address paging system as claimed in claim 15, wherein each message machine includes a scheduler for sending messages over the network at scheduled times.

18. A decentralized public address paging system as claimed in claim 15, wherein said message machines are loaded with a software application to convert text segments into spoken messages.

19. A decentralized public address paging system as claimed in claim 1, further including an interface for interfacing the network and a plurality of analogue inputs together, the interface being configured to translate audio into data packets.

20. A decentralized public address paging system as claimed in claim 1, further includes a background music input unit for transmitting background music data over the network.

21. A decentralized public address paging system as claimed in claim 1, the paging system further including a control panel for enabling a user to control the paging data.

22. A decentralized public address paging system as claimed in claim 21, wherein the control panel includes any-one or more of the following group: a display for displaying background music selections, a means for setting audio levels of the paging data, and buttons for adjusting source selection and page inhibit functions of the network.

23. A decentralized public address paging system as claimed in claim 1, further including one or more local volume controllers for each controlling the volume of a respective speaker interfaced to an addressable amplifier module.

24. A decentralized public address paging system as claimed in claim 23, wherein each local volume controller includes a means for enabling a user to vary the volume and a display for displaying the volume of the speaker.

25. A decentralized public address paging system as claimed in claim 1, further including a device for receiving user inputs, and selecting and sending data packets responsive to the received user inputs.

26. A decentralized public address paging system as claimed in claim 25, wherein the user inputs are derived from switches, potentiometers, or voltage sources.

27. A decentralized public address paging system including;

a plurality of public address paging console units, each including an operator interface to select one or more destination paging zones, a microphone and a network interface circuit for transmitting digital audio signals and command signals across a network; and a number of public address addressable amplifiers each including a network interface circuit in communication with the network and arranged to transmit data indicating operational status and local ambient acoustic conditions across the network characterized in that each paging system console is configured to listen to page control data packets received from other paging devices on the network to generate an engaged paging destination set and resolve the simultaneous transmission of data packets to the same paging destination using priority whereby paging system consoles transmitting lower priority data packets locally store the packets for later forwarding; and wherein the engaged paging destination set is a set of destination zones for currently active paging events.

28. A decentralized public address paging system as claimed in claim 1, wherein each paging system console monitors critical aspects of its operation including one or more of power supply rails, memory operation, program instruction checksums, network error rates, connection faults, critical audio signal path and software operation faults.

29. A decentralized public address paging system as claimed in claim 1, further including at least one monitoring device for monitoring speaker lines for errors and/or faults.

30. A decentralized public address paging system as claimed in claim 4, wherein each paging system console includes a means for compensating for microphone response variations caused by speaker distance or proximity effect, and variations in speech level.

31. A decentralized public address paging system as claimed in claim 1, wherein each paging system console and amplifier module use priority to store audio information in local memory for later use.

32. A decentralized public address paging system as claimed in claim 1, wherein paging system console identifiers can be used to resolve the simultaneous transmission of data packets having the same priority.

33. A decentralized public address paging system as claimed in claim 1, wherein each amplifier control module has channels assigned to any zones, zones.

34. A decentralized public address paging system as claimed in claim 1, wherein the transmitted data includes an audio message which includes preamble tones or bells derived from a paging system console, or is a recorded message derived from a message machine.

* * * * *